US012766615B2

(12) United States Patent
Suhling

(10) Patent No.: US 12,766,615 B2
(45) Date of Patent: Oct. 20, 2026

(54) CUTTING PROTECTION GUIDE FOR CUTTING TOOLS

(71) Applicant: Robert James Suhling, Waukegan, IL (US)

(72) Inventor: Robert James Suhling, Waukegan, IL (US)

( * ) Notice: Subject to any disclaimer, the term of this patent is extended or adjusted under 35 U.S.C. 154(b) by 128 days.

(21) Appl. No.: 19/045,969

(22) Filed: Feb. 5, 2025

(65) Prior Publication Data

US 2025/0178108 A1 Jun. 5, 2025

(51) Int. Cl.
*B23D 47/04* (2006.01)
*B23D 47/00* (2006.01)
*B27B 27/04* (2006.01)
*B23D 45/04* (2006.01)

(52) U.S. Cl.
CPC ........... *B23D 47/04* (2013.01); *B23D 47/005* (2013.01); *B27B 27/04* (2013.01); *B23D 45/044* (2013.01)

(58) Field of Classification Search
CPC .... B23D 47/04; B23D 47/005; B23D 45/044; B23D 45/046; B23D 45/048; B23D 45/042; B27B 27/04; B27B 27/00; B27B 27/02; B27B 27/06; B27B 27/08; B27B 27/10; B27B 29/00; Y10T 83/5669; Y10T 83/5815; Y10T 83/748; Y10T 83/7487; Y10T 83/7593; Y10T 83/7607; Y10T 83/7613; Y10T 83/762; Y10T 83/7627; Y10T 83/7693; Y10T 83/7697; Y10T 83/7701; Y10T 83/7705
See application file for complete search history.

(56) References Cited

U.S. PATENT DOCUMENTS

| | | | |
|---|---|---|---|
| 1,504,248 | A | 8/1924 | Charles |
| 1,823,268 | A | 9/1931 | James |
| 2,435,382 | A | 2/1948 | Caskey |
| 4,693,158 | A | 9/1987 | Price |
| 4,817,693 | A | 4/1989 | Schuler |
| 4,871,156 | A | 10/1989 | Kozyrski |
| 4,887,653 | A | 12/1989 | Thomas |
| 4,948,313 | A | 8/1990 | Zankovich |
| 5,018,562 | A | 5/1991 | Adams |
| 5,038,486 | A | 8/1991 | Ducate, Sr. |
| 5,063,983 | A | 11/1991 | Barry |
| 5,267,818 | A | 12/1993 | Marantette |
| 5,359,824 | A | 11/1994 | Koberstein |
| 5,647,707 | A | 7/1997 | Poulin |
| 5,664,612 | A | 9/1997 | Klemma |
| 5,716,045 | A | 2/1998 | Taylor |
| 5,765,448 | A | 6/1998 | Martelli |
| 5,768,966 | A | 6/1998 | Duginske |
| 5,845,555 | A | 12/1998 | Dawley |

(Continued)

*Primary Examiner* — Phong H Nguyen
(74) *Attorney, Agent, or Firm* — Lesavich High-Tech Law Group, S.C.; Stephen Lesavich

(57) ABSTRACT

Cutting protection guide for cutting tools. The Cutting protection guide includes different clamping components providing plural adjustable clamping pressures at plural different vertical and horizontal and arc curve position locations for a clamping point to clamp down and securely hold a piece of material being cut on a cutting saw. The cutting protection guide allows very small pieces (e.g., about 1 to 2 inches or less, etc.) of materials (e.g., wood, metal, plastic, etc.) to be safely cut without endangering a safety of a user using the cutting saw.

24 Claims, 19 Drawing Sheets

(56) References Cited

U.S. PATENT DOCUMENTS

| | | | | |
|---|---|---|---|---|
| 5,890,524 | A | 4/1999 | Tucker et al. | |
| 5,903,125 | A | 5/1999 | Prentice et al. | |
| 5,919,014 | A | 7/1999 | Weck et al. | |
| 6,328,510 | B1 | 12/2001 | Hanrath et al. | |
| 6,557,601 | B1 | 5/2003 | Taylor | |
| 6,851,243 | B1 | 2/2005 | Sandford | |
| 6,851,345 | B1 | 2/2005 | Kennelly | |
| 7,036,540 | B2 | 5/2006 | Welsh et al. | |
| 7,100,515 | B2 | 9/2006 | Helm et al. | |
| 7,261,502 | B2 | 8/2007 | Pasquetto | |
| 7,587,838 | B2 | 9/2009 | Mastrobattista | |
| 8,033,535 | B2 | 10/2011 | Mannon | |
| 8,220,374 | B2 | 7/2012 | Wang | |
| 8,272,334 | B2 | 9/2012 | Wang et al. | |
| 8,342,055 | B2 | 1/2013 | Wang et al. | |
| 8,463,765 | B2 | 6/2013 | Lesavich | |
| 8,480,067 | B2 | 7/2013 | Furlow | |
| 8,621,969 | B2 | 1/2014 | Dawley, III | |
| 8,661,956 | B2 * | 3/2014 | Thomas | B23D 45/044 83/471.3 |
| 9,037,564 | B2 | 5/2015 | Lesavich et al. | |
| 9,056,402 | B2 | 6/2015 | Clark | |
| 9,137,250 | B2 | 9/2015 | Lesavich et al. | |
| 9,361,479 | B2 | 6/2016 | Lesavich et al. | |
| 9,545,734 | B2 | 1/2017 | Suhling | |
| 9,569,771 | B2 | 2/2017 | Lesavich et al. | |
| 9,616,587 | B2 | 4/2017 | Xu | |
| 9,682,454 | B2 | 6/2017 | Suhling | |
| 10,022,887 | B2 * | 7/2018 | Hogenhout | B27B 27/06 |
| 10,245,653 | B2 | 4/2019 | Suhling | |
| 10,336,127 | B1 | 7/2019 | Suhling | |
| 10,661,457 | B2 | 5/2020 | France | |
| 10,766,109 | B2 | 9/2020 | Suhling | |
| 10,836,066 | B2 | 11/2020 | Suhling | |
| 10,858,058 | B2 | 12/2020 | Suhling | |
| 11,180,171 | B1 | 11/2021 | Suhling | |
| 11,383,336 | B2 | 7/2022 | Suhling | |
| D1,003,680 | S | 11/2023 | Sherman | |
| 2005/0056345 | A1 | 3/2005 | Duginske | |
| 2008/0053283 | A1 | 3/2008 | Lin | |
| 2009/0095141 | A1 | 4/2009 | Billings | |
| 2011/0208710 | A1 | 8/2011 | Lesavich | |
| 2012/0278622 | A1 | 11/2012 | Lesavich et al. | |
| 2014/0026725 | A1 | 1/2014 | Makropoulos | |
| 2014/0189792 | A1 | 7/2014 | Lesavich et al. | |
| 2015/0298273 | A1 | 10/2015 | Suhling | |
| 2015/0306784 | A1 | 10/2015 | Suhling | |
| 2015/0379301 | A1 | 12/2015 | Lesavich et al. | |
| 2016/0321654 | A1 | 11/2016 | Lesavich et al. | |
| 2018/0030717 | A1 | 2/2018 | Yang | |
| 2018/0043439 | A1 | 2/2018 | Suhling | |
| 2018/0187411 | A1 | 7/2018 | Shang | |
| 2019/0381614 | A1 | 12/2019 | Suhling | |
| 2019/0389500 | A1 | 12/2019 | Suhling | |
| 2020/0001495 | A1 | 1/2020 | Suhling | |
| 2020/0215713 | A1 | 7/2020 | Friedebach | |
| 2021/0023636 | A1 * | 1/2021 | Chiang | B23D 45/048 |
| 2021/0394319 | A1 | 12/2021 | Suhling | |
| 2023/0234257 | A1 | 7/2023 | Sherman | |

* cited by examiner

CUTTING PROTECTION GUIDE FOR CUTTING TOOLS

CROSS REFERENCES TO OTHER APPLICATIONS

Not Applicable.

FIELD OF INVENTION

This application relates to clamping of materials during cutting. More specifically, it relates to cutting protection guides for cutting tools.

BACKGROUND OF THE INVENTION

When a saw such as a table top saw, a chop saw, miter saw, etc. is used to cut a material, such as wood, metal, plastic, cutting protection guides including clamps are used to prevent injuries to a person cutting the materials.

Cutting protection guides keep material pieces square to a cutting blade on a saw for accuracy, and allows the use of stops for repeat cuts and align the material to keep it straight while being cut. Cutting protection guides provide measure of safety for a user of a cutting saw.

There are several problems associated with cutting protection guides used for cutting saws. One problem is that many cutting protection guides are handheld by a user of a cutting saw and require a user of the cutting saw to push a material being cut past the cutting blade.

Another problem is this most cutting protection guides are not useable for cutting saws to hold a very small piece of material (e.g., about 1 or 2 inches or less) of material being cut.

Another problem is this most cutting protection guides are not useable for cutting saws to hold a very small piece of material including a large width, height or thickness of material being cut.

Another problem is that most cutting protection guides are not adjustable to apply different types of downward pressure.

Another problem is that most cutting protection guides are not adjustable in a vertical, horizontal, or on a desired arc, to hold a piece of small material to cut the material at desired angles.

Another problem is that most cutting protection guides are static and not dynamically movable on the cutting saw.

Another problem is that most cutting protection guides are not dynamically adjustable in both a vertical and a horizontal position on the cutting saws.

Another problem is that most cutting protection guides are not designed to hold a piece of material at various angles so a material (e.g., a crown molding material) that needs to be cut a very specific angle (e.g., for a corner of a room, etc.) can be cut safely.

Another problem is that most cutting protective guides are not easily adjustable to allow easy advancement of a piece of material being cut.

Another problem is that most cutting protective guides do not provide multiple different surfaces at multiple different angles to hold a piece of material being cut.

Another problem is that most cutting protective guides do not absorb vibrational forces and torquing forces from the cutting blade of the cutting saw. Such forces are generated when a small piece of material is to be cut and often cause kickback to move the material resulting in a piece of material hard to hold and often leading to an imprecise cut or cut at an improper angle.

There have been several attempts to solve some of the problems associated cutting protection guides.

For example, U.S. Pat. No. 11,383,336, that issued to Suhling teaches "A reversible flip-away work-stop for strut systems. The reversible flip-way work stop includes a first component allowing a work stop positioning plate to pivot in a semi-circular motion allowing the work stop positioning plate to be moved and immediately configured in a right-handed configuration or a left-handed configuration without manual disassembly and reassembly in a strut in a strut system. A second component allowing the work stop positioning plate to be micro-adjusted to measurements including thousands of an inch for precisely measuring a material to be cut. A third component includes a pre-determined length to exactly match an alignment of a front face of the work stop positioning plate allowing a measurement to be read on a measuring component in the strut on the strut system without obstruction. The third component also including a pre-determined width and shape matching a width and a shape of a measuring component in the strut on the strut system allowing easy movement of the reversible flip-away work stop within the strut in the strut system and providing the ability to add a custom measuring component to the strut system."

U.S. Pat. No. 10,766,109, that issued to Suhling teaches "The invention allows for alignment perpendicular to a track engaged by a securing nut. An opposing tooth key type aligner has two functions: keeps the second track perpendicular to the first track and allows the securing nut to always be correctly oriented to engage with the track. A bolt clamps the securing nut to the track to lock the position of the invention. A second axis perpendicular to the lower track is created with a second track. A bolt connected to a coupler nut engages with the middle track to create a third axis perpendicular to both previous axes. A washer provides a neutral bearing surface between the coupler nut and second track. An elevation bolt sets the vertical position of the object to be mounted. A bolt can be used to fasten an object to the end of the elevation bolt."

U.S. Pat. No. 10,836,066, that issued to Suhling teaches "A Zero Clearance Fence that gives precision to chop saw fences. The invention consists of two flat surfaces and mounting devices. The flat surfaces are beveled at one edge of both surfaces. The beveled edge allows a tape measure to be hooked on at any desired miter angle. The invention mounts onto the original chop saw fences so that they are able to slide towards and away from the saw blade. The ability to slide allows the fences to always be right next to the saw blade at any miter angle cut for precision in the cut measurements. The mounting apertures can be located anywhere to allow the Zero Clearance Fence to fit on any chop saw."

U.S. Pat. No. 9,682,454, that issued to Suhling teaches "An in-line indexing mechanism as part of a work-stop system which employs a lead screw to alter the relative distance between a work-stop plate and a swing arm—as well as alignment pins and springs to maintain contact and rigidity between this work-stop plate and swing arm—in order to precisely alter the parameters of a workpiece plane. In particular, the indexing mechanism of the preferred embodiment resides within the extension of an arm, and is located, by default, within the workpiece plane; the act of indexing therefore exerts force upon a workpiece along a coincident axis within said workpiece plane. Additionally, the indexing mechanism may be removed from the workpiece plane, by way of axially rotating the arm, without abandoning the original workpiece parameter and adjustment values."

U.S. Pat. No. 9,545,734, that issued to Suhling teaches "A clamp that is meant to act as a coordinate locator for any number of power tools, but most specifically for use with the Biesemeyer T-style table saw fences. The assembly is comprised of a C-frame which offers the ability to enact a clamping action and the ability to enact an indexing action. The design of the assembly allows not only for the clamping of an imprecise reference point along a table saw fence, but also the fine adjustment of indexing a screw against the table saw fence."

However, these solutions still do not solve all of the problems associated with cutting protection guides used for cutting saws. Thus, it is desirable to solve some of the problems associated with cutting protection guides used for cutting saws.

SUMMARY OF THE INVENTION

In accordance with preferred embodiments of the present invention, some of the problems associated with clamping materials during cutting are overcome. A cutting protection guide for cutting tools is presented.

Cutting protection guide for cutting tools. The Cutting protection guide includes different clamping components providing plural adjustable clamping pressures at plural different vertical and horizontal and arc curve position locations for a clamping point to clamp down and securely hold a piece of material being cut on a cutting saw. The cutting protection guide allows very small pieces (e.g., about 1 to 2 inches, or less, etc.) of materials (e.g., wood, metal, plastic, etc.) to be safely cut without endangering a safety of a user using the cutting saw.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Cutting Protection Guide for Cutting Tools

Figure 1:
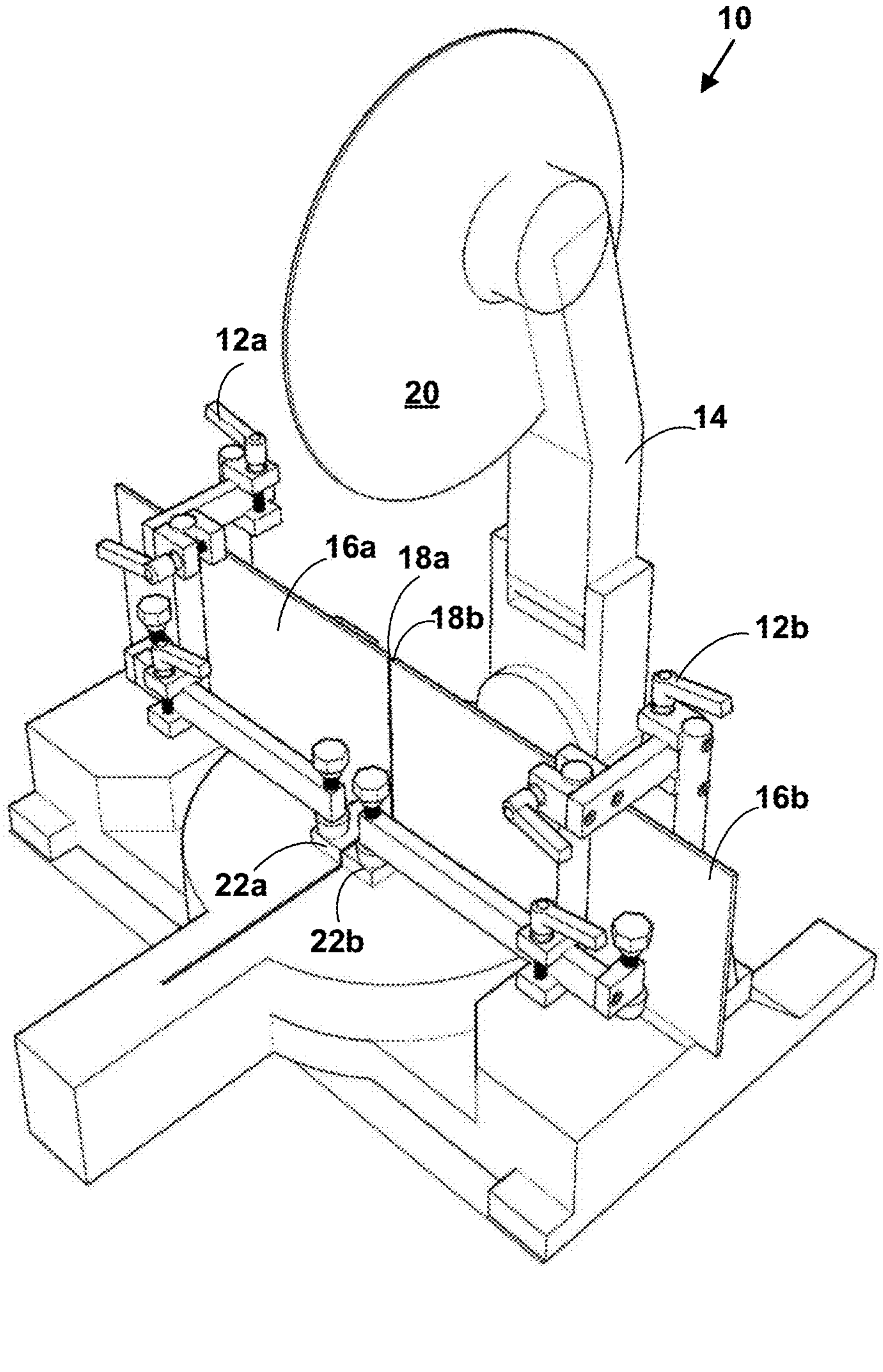
FIG. 1 is a block diagram illustrating a perspective view of cutting protection guide for cutting tools with a cutting saw.

FIG. 1 is a block diagram 10 illustrating a perspective view of cutting protection guide for cutting tools with a cutting saw.

In FIG. 1, illustrates cutting protection guide for cutting tools 12*a*, 12*b* on a cutting saw 14, illustrated as a chop saw in FIG. 1, with a zero-clearance fence 16*a*, 16*b*.

The zero-clearance fence 16, 16*b* includes, but is not limited to, a left fence 16*a* and a right fence 16*b*, and two beveled edges 18*a*, 18*ab* one on each end of the left fence 16*a* and right fence 16*b*. A zero-clearance fence includes a beveled edge 18*a*, 18*ab* on the edge closest to the saw blade 20 on each of left fence 16 and right fence 16*b*. The beveled edges 18*a*, 18*ab* are on the back sides of the inner edges to allow a minimal but proper amount of saw blade 20 space for any miter cut angle from the chop saw 14. The zero-clearance fence is used to securely hold an edge of piece of material 22*a*, 22*b* (e.g., wood, metal, plastic, pipes, sheet materials, molding materials, baseboard materials, etc.) to be cut. In However, the present invention is not limited to such an embodiment and other embodiments can be used to practice the invention with and/or without a zero-clearance fence.

In one specific embodiment, the zero-clearance fence 16, 16*b* includes, but is not limited to, a zero-clearance fence taught by U.S. Pat. No. 10,836,066, that issued to Suhling entitled "A Zero Clearance Fence", the contents of which are incorporated by reference. However, the present invention is not limited to such an embodiment and other embodiments with other safety fences and/or other zero-clearance fences can be used to practice the invention.

FIG. 1 further includes, the cutting protection guide for cutting tools 12*a*, 12*b* on holding a small piece of material 22*a*, 22*b* (e.g., wood, metal, plastic, etc.) that has been cut in half.

Figure 2:
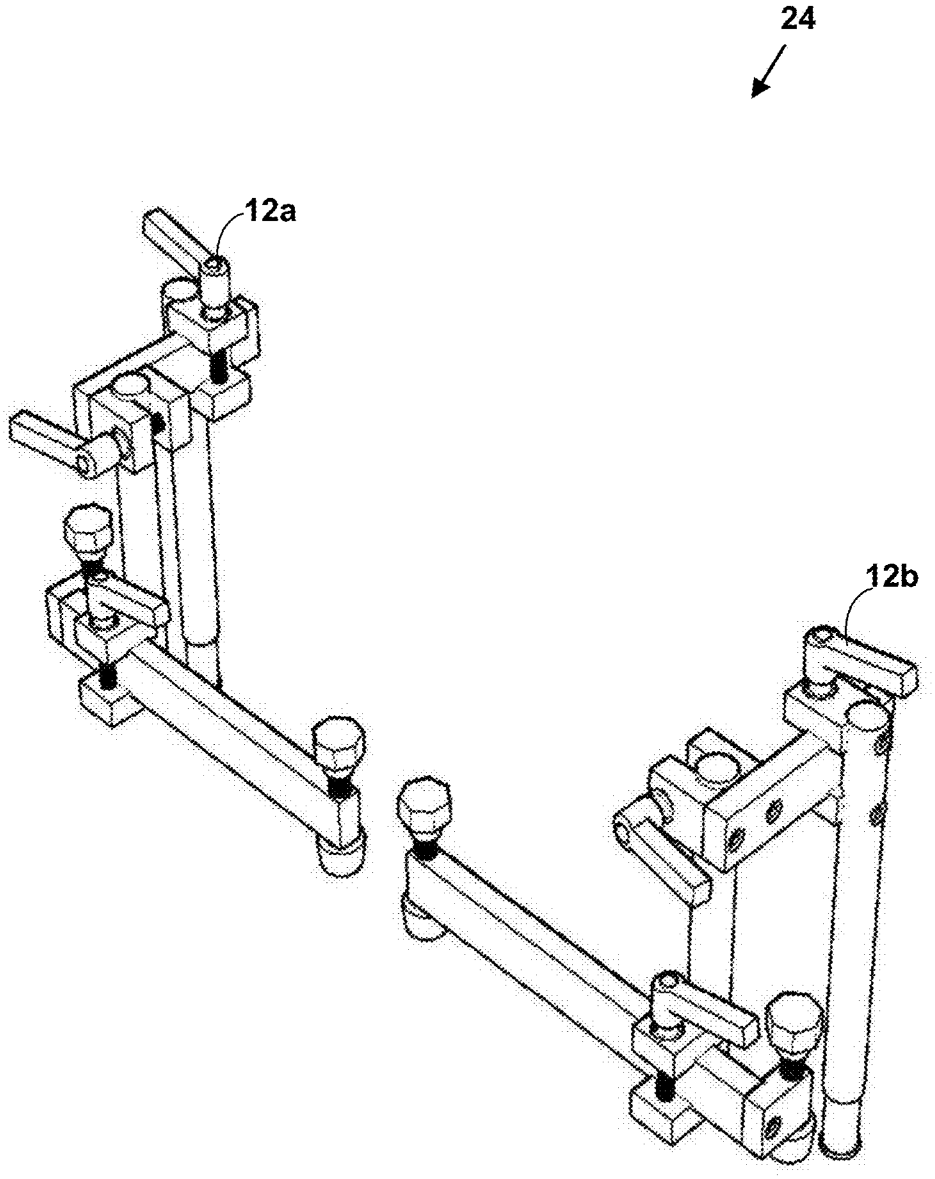
FIG. 2 is a block diagram illustrating a perspective view of cutting protection guide for cutting tools.

FIG. 2 is a block diagram 24 illustrating a perspective view of a cutting protection guide for cutting tools 1.

FIG. 2 illustrates a left cutting protection guide for cutting tools 12*a* and a right apparatus 12*b* for cutting tools 12*a*, 12*b*.

Figure 3:
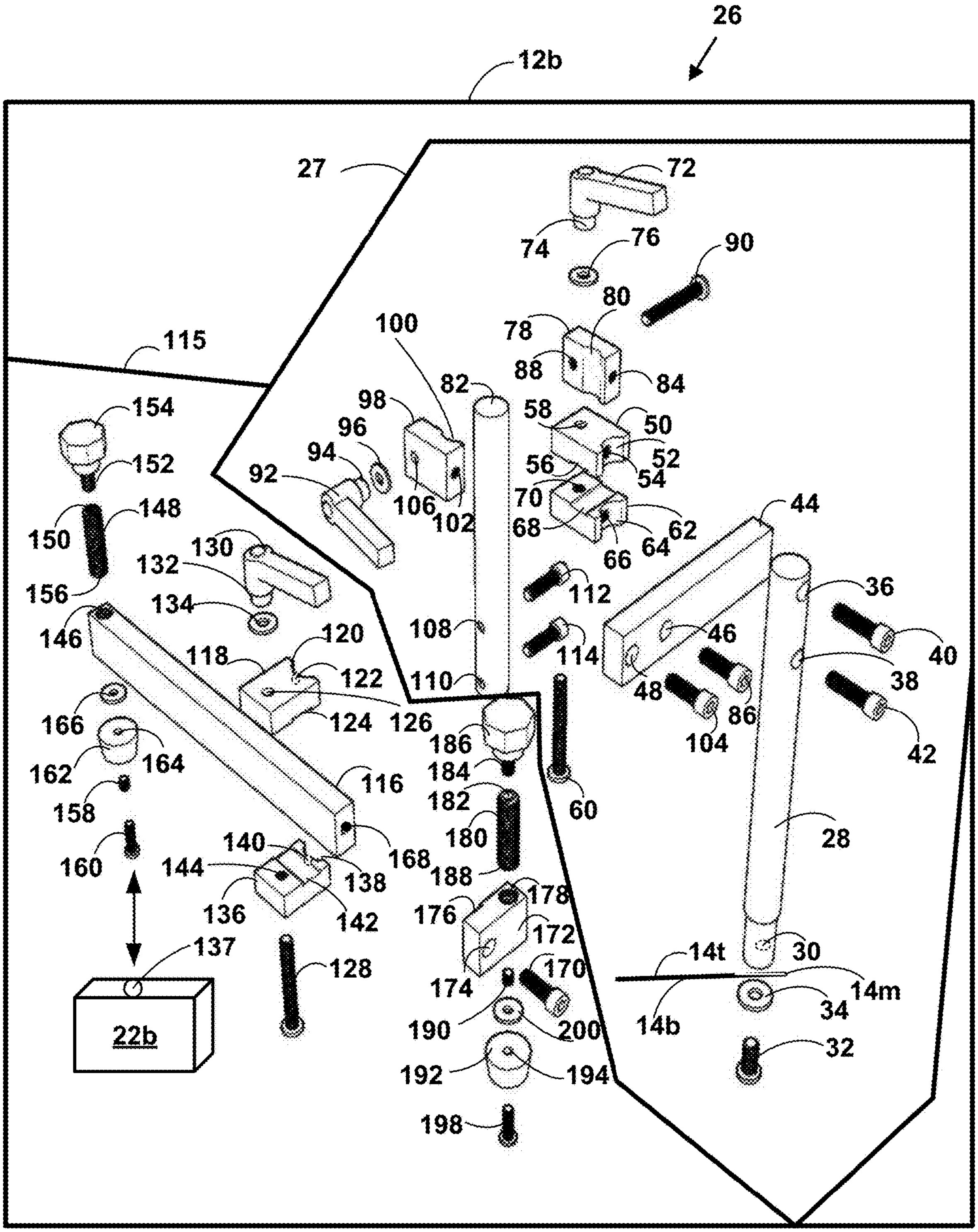
FIG. 3 is a block diagram illustrating an exploded view of cutting protection guide for cutting tools.

FIG. 3 is a block diagram 26 illustrating an exploded view of cutting protection guide for cutting tools.

In FIG. 3, the cutting protection guide 12*b* for cutting tools includes a first clamping component 27. The first clamping component 27 includes a saw mounting component 28 to mount the cutting protection guide 12*b* to the cutting saw 14. The saw mounting component 28 includes a first saw mounting receptacle 30 to engage a first saw mounting connection means 32 to mount the saw mounting component 28 to a top surface 14*t* of the cutting saw 14. A first washer component 34 is used with the first saw mounting connection means 32 to make the connection to the cutting saw 14 more secure and prevent slippage and absorbing torquing forces and vibrational forces from the cutting saw 14. When a piece of material is cut, if it is not held securely, it is subject to vibrational forces and torquing forces from the saw blade 20 of the cutting saw 14 and such forces may cause a piece of material to be cut to be twisted and/or "kicked back" toward a user of the cutting saw 14 and/or lead to a crooked and/or imprecise cut (i.e., longer, shorter, etc.) of the material 22*a*, 22*b*. The saw mounting component 28 is mounted to on a top surface 14*t* of the cutting saw 14 and the first saw mounting connection means 32 with the first washer component 34 is mounted on a bottom surface 14*b* of the cutting saw 14. In such an embodiment, the cutting saw 14 includes a number of pre-drilled mounting receptacles 14*m* that are created when the cutting saw 14 is manufactured as a standard feature. In another embodiment, mounting receptacles 14*m* are drilled before use because the cutting saw 14 did not include any mounting receptacles 14*m* when it was manufactured. However, the present invention is not limited to such embodiments and other connection means can be used to practice the invention.

In one embodiment, the first saw mounting connection means 32, includes but is not limited to, a bolt, screw, rivet and/or other connection means. In FIG. 3, the first saw mounting receptacle 30 includes, but is not limited to a threaded first saw mounting receptacle 30 and the first saw mounting connection means 32 is illustrated as a threaded screw with a rounded head including a hexagonal receptacle for engaging a hexagonal and/or ALLEN wrench. In another embodiment, the first saw mounting receptacle 30 and the first saw mounting connection means 32 are partially threaded. However, the present invention is not limited to such embodiments and other connection means can be used to practice the invention.

An ALLEN wrench is an L-shaped metal bar with a hexagonal head at each end, used to turn bolts and screws having hexagonal sockets.

The saw mounting component 28 further includes a second saw mounting receptacle 36 and a third saw mounting receptacle 38, both extending through the saw mounting component 28 for connecting the saw mounting component 28 with a second saw mounting connection means 40 and a third saw mounting connection means 42 to connect the saw mounting component 28 to a first horizontal component 44. In FIG. 3, in one embodiment, the second saw mounting receptacle 36 and the third saw mounting receptacle 38 include non-threaded receptacles. In another embodiment, the second saw mounting receptacle 36 and third saw mounting receptacle 38 includes threaded and/or partially threaded receptacles. However, the present invention is not limited to such embodiments and other connection means can be used to practice the invention.

In one embodiment, second saw mounting connection means 40 and a third saw mounting connection means 42, include but are not limited to, a bolt, screw, rivet and/or other connection means. In FIG. 3, the second saw mounting connection means 40 and the third saw mounting connection means 42 include, but are not limited to, threaded screws with a protruding head component to include additional binding force and prevent turning and/or slipping of the connection means 40, 42, the protruding head including a hexagonal receptacle for engaging a hexagonal and/or ALLEN wrench. In another embodiment the second saw mounting connection means 40 and the third saw mounting connection means 42 are partially threaded. However, the present invention is not limited to such embodiments and other connection means can be used to practice the invention.

In one embodiment, the first clamping component 27, includes to a first top clamping block 50 with a first curved side surface 52 for engaging and holding a first portion of a curved side surface of the saw mounting component 28 and a first curved side surface receptacle 54 for engaging the second saw mounting connection means 40 of the saw mounting component 28.

In one embodiment, first curved side surface receptacle 54 includes, but is not limited to, a threaded receptacle for engaging the second saw mounting connection means 40 that comprises a threaded screw with the protruding head. In another embodiment, the first curved side surface receptacle 54 and the second saw mounting connection means 40 are partially threaded. However, the present invention is not limited to such embodiments and other connection means can be used to practice the invention.

The first top clamping block 50 further including a first rectangular notch 56 in a bottom surface of the first top clamping block 50 for engaging and securely holding the first horizontal connection component 44 on a top surface of the first horizontal connection component 44.

The first top clamping block 50 further including a first top side receptacle 58 without threads in a top surface and extending through the top surface of the first top clamping block 50, for engaging a first adjustment handle connection means 60.

In one embodiment, the first adjustment handle connection means 60 includes, but is not limited to, a bolt, screw, rivet and/or other connection means. The first adjustment handle connection means 60 is illustrated as threaded screw with a round head including a hexagonal receptacle for engaging a hexagonal and/or ALLEN wrench. However, the present invention is not limited to such embodiments and other connection means can be used to practice the invention.

In another embodiment, the first receptacle 58 comprises a threaded receptacle for engaging the first adjustment handle connection means 60. In another embodiment, the first receptacle 58 comprises a partially threaded receptacle for engaging a partially threaded first handle connection means 60. However, the present invention is not limited to such embodiments and other connection means with and/or without threads can be used to practice the invention.

The first clamping component 27 further includes, a first bottom clamping block 62 with a curved side surface 64 for engaging and holding a second portion of the curved side surface of the saw mounting component 28 and a curved side surface receptacle 66 for engaging the third saw mounting connection means 42 of the saw mounting component 28.

In one embodiment, the curved side surface receptacle 64 includes, but is not limited to, a threaded receptacle for engaging the third saw mounting connection means 42 that comprises a threaded screw with a protruding head. In another embodiment, the curved side surface receptacle 64 and the third saw mounting connection means 42 are partially threaded. However, the present invention is not limited to such embodiments and other connection means with and/or without threads can be used to practice the invention.

The first bottom clamping block 62 further including a notched surface on a top surface of the first bottom clamping block 62 including a rectangular notch 68 for engaging and securely holding the first horizontal connection component 44 on a bottom surface of the first horizontal connection component 44.

The first bottom clamping component block 62 further including a threaded second receptacle 70 on a top surface of the first clamping block 62 extending through the second clamping component block 62 for engaging the first adjustment handle connection means 60.

The first clamping component 27 further includes a first adjustment handle 72 with a threaded receptacle 74 for accepting and engaging the first handle connection means 60. The first adjustment handle 72 adjusts tension of the first top clamping block 50 and the first bottom clamping block 62 by rotating the first adjustment handle 72 clockwise to tighten and counterclockwise to loosen downward pressure on the first horizontal connection component 44. The first adjustment handle 72 adjust a horizontal position of the first horizontal connection component 44 on the top surface 14*t* of the cutting saw 14. However, the present invention is not limited to such embodiments other embodiments be used to practice the invention.

Adjusting a horizontal position of the first horizontal connection component 44 moves the cutting protection guide 12*b* holding the material to be cut 22*b* (e.g., wood, metal, plastic, pipes, sheet materials, molding materials, baseboard materials, etc.) closer to and/and farther away from the zero-clearance fence 16*b* and/or closer to and/or further away from the cutting blade 20 the cutting saw 14 and/or the cutting protection guide 12*b* holding the material to be cut 22*b* closer to and/or farther away from the cutting blade 20 of the cutting saw 14 if the zero-clearance fence 16*b* is not used. However, the present invention is not limited to such embodiments other embodiments be used to practice the invention.

The first adjustment handle 72 further includes a first adjustment handle washer component 76 for engaging the first handle connection means 60 extending through the first top clamping block 50 and the first bottom clamping block 62. The first adjustment handle washer component 76 provides additional tightening tension for the first adjustment handle 72. However, the present invention is not limited to such embodiments other embodiments be used to practice the invention.

The first clamping component 27, further includes, a first side clamping component block 78 with a first curved side surface 80 for engaging and holding a first portion of a curved side surface of a vertical support component 82.

The first side clamping component block 78 further includes a first side receptacle 84 for engaging a first side block connection means 86.

In one embodiment, first side block connection means 86 includes, but is not limited to, a bolt, screw, rivet and/or other connection means. The first side block connection means 86 is illustrated as threaded screw with a protruding head including a hexagonal receptacle for engaging a hexagonal and/or ALLEN wrench. In another embodiment, the first side receptacle 84 and first side block connection means 86 are partially threaded. However, the present invention is not limited to such embodiments and other connection means can be used to practice the invention.

The first side clamping component block 78 further includes a second side receptacle 88 passing through the first side clamping block 78 for engaging and holding a second adjustment handle connection means 90.

In one embodiment, the second adjustment handle connection means 90 includes, but is not limited to, a bolt, screw, rivet and/or other connection means. The second adjustment handle connection means 90 is illustrated as threaded screw with a rounded head including a hexagonal receptacle for engaging a hexagonal and/or ALLEN wrench. In another embodiment, the second side receptacle 88 and the second adjustment handle connection means 90 are partially threaded. However, the present invention is not limited to such embodiments and other connection means can be used to practice the invention.

The first clamping component 27 further includes a second adjustment handle 92 with a threaded receptacle 94 for accepting and engaging second handle connection means 90.

The first clamping component 27 further includes a second adjustment handle washer component 96 for engaging the second adjustment handle connection means 90 extending through the first side clamping block 78 and a second side clamping block 98. The second adjustment handle washer component 96 provides additional tightening tension for the second adjustment handle 92. However, the present invention is not limited to such embodiments other embodiments be used to practice the invention.

The second adjustment handle 92 adjusts tension of the first side clamping block 78 and the second side clamping block 98 by rotating the second adjustment handle 92 clockwise to tighten and counterclockwise to loosen sideways pressure on the vertical support component 82. However, the present invention is not limited to such embodiments other embodiments be used to practice the invention.

The second side clamping block 98 includes a curved side surface 100 for engaging and holding a second portion of the curved side surface of the vertical support component 82. The second side clamping block 98 further includes, a first side receptacle 102 that is threaded for engaging a second side block connection means 104.

In one embodiment, the second side block connection means 104 includes, but is not limited to, a bolt, screw, rivet and/or other connection means. The second side block connection means 104 is illustrated as threaded screw with a protruding head including a hexagonal receptacle for engaging a hexagonal and/or ALLEN wrench. In another embodiment, the first side receptacle 102 and the second side block connection means 104 are partially threaded. However, the present invention is not limited to such embodiments and other connection means can be used to practice the invention.

The second side clamping component block 98 further includes a second side receptacle 106 passing through the second side clamping block 98 for engaging the second handle connection means 90. In one embodiment, the second side receptacle 106 does not include any threads. In another embodiment, the second side receptacle 106 is partially threaded. However, the present invention is not limited to such embodiments and other connection means can be used to practice the invention.

The vertical support component 82 further includes a first vertical support receptacle 108 and a second vertical support receptacle 110 both extending through the vertical support component 82 to engage a first vertical support connections means 112 and a second vertical support connection means 114 for connecting the vertical support component 82 to a second clamping component 115 including a second horizontal component 116. In one embodiment, the first vertical support receptacle 108 and the second vertical support receptacle 110 are not threaded.

In one embodiment, the first vertical support connections means 112 and the second vertical support connection means 114 includes, but is not limited to, a bolt, screw, rivet and/or other connection means. The first vertical support connections means 112 and the second vertical support connection means 114 are illustrated as threaded screws with a protruding head including a hexagonal receptacle for engaging a hexagonal and/or ALLEN wrench. In another embodiment, the first vertical support receptacle 108 and the second vertical support receptacle 110 are threaded and/or partially threaded. However, the present invention is not limited to such embodiments and other connection means can be used to practice the invention.

The second clamping component 115 includes a second top clamping block 118*a*, with a curved surface 120 for engaging a second side surface of the vertical support component 82. The second top clamping block 118*a* including a first side receptacle 122*a* for accepting and the engaging first vertical support connections means 112. The second top clamping block 118*a*, further includes a rectangular notch 124 on a bottom surface of the second top clamping block 118*a* for engaging and securely holding the second top clamping block 118*a* on a top surface of the second horizontal component 116. The second top clamping block 118*a* further includes a top receptacle 126 extending through the second top clamping block 118*a* to engage hold a third adjustment handle connection means 128.

The second clamping component 115 further includes a third adjustment handle 130 with a threaded receptacle 132 for accepting and engaging the third adjustment handle connection means 128. The third adjustment handle 130 adjusts tension of the first top clamping block 118*a* and a second bottom clamping block 136 by rotating the third adjustment handle 130 clockwise to tighten and counter-clockwise to loosen downward pressure on the second horizontal component 116. The Third adjustment handle 130 allows adjustment of a horizontal position of the second horizontal component 116 and the materials to be cut 22*b* closer to and/or farther away from the cutting blade 20 on the top surface 14*t* of the cutting saw 14. Third adjustment handle 130 adjusts the second horizontal component 116 in a horizontal motion that is perpendicular to the horizontal motion of the first horizontal component 44 that is controlled by the first adjustment handle 72. However, the present invention is not limited to such embodiments other embodiments be used to practice the invention.

The second clamping component 115 further includes a third adjustment handle washer component 134 for engaging the third adjustment handle connection means 128 extending through the top clamping block 118*a* and the bottom clamping block 136. The third adjustment handle washer component 134 provides additional tightening tension for the third adjustment handle 130. However, the present invention is not limited to such embodiments other embodiments be used to practice the invention.

The second bottom clamping block 136 includes a curved surface 138 for engaging a second side surface portion of the vertical support component 82. The second bottom clamping block 136 includes a first side receptacle 140 for accepting and the engaging the second vertical support connections means 114. The second bottom clamping block 136 further includes a rectangular notch 142 in a top surface of the second bottom clamping block 136 for engaging and securely holding the second bottom clamping block on a bottom surface of the second horizontal component 116. The second bottom clamping block 136 further includes a threaded top receptacle 144 in a top surface of the second bottom clamping block 136 extending through the second bottom clamping block 136 to engage the third adjustment handle connection means 128. In another embodiment, the top receptacle 144 is not threaded and/or partially threaded. However, the present invention is not limited to such embodiments other embodiments be used to practice the invention.

The second horizontal component 116 further includes a first threaded receptacle 146 in a top surface of the second horizontal component 116 extending through the second horizontal component 116 to engage a fourth adjustment handle connection means 148. The fourth adjustment handle connection means 148 includes a threaded component with a threaded first receptacle 150 in a top surface for accepting and engaging a threaded handle connection means 152 on a fourth adjustment handle 154. The fourth adjustment handle connection means 148 further includes a second threaded receptacle 156 in a bottom surface for accepting and engaging a first grommet connection means 158 and a second grommet connection means 160. The first grommet connections means 158 is inserted into the second threaded receptacle 156 in the bottom surface of fourth adjustment handle connection means 148 to allow for adjustment of a first grommet 162 with adjustments of the first grommet connection means 158 and the second grommet connection means 160. The first grommet 162 includes a central receptacle 164 for accepting and engaging the second grommet connection means 160. A grommet washer 166 makes the connection of the grommet 164 more secure and prevents slippage of the grommet 164 when holding down materials 22*b* to be cut.

The first grommet 162 places downward pressure on and securely holds the materials 22*b* to be cut and prevents the materials 22*b* being cut from being damaged by the first grommet 162. The first grommet 162 allows secure clamping of holding of materials 22*b* to be cut to very small lengths and very small widths as small as about 0.5 inches (about 1.27 centimeters) or less.

The second horizontal component 116 further includes a second threaded receptacle 168 in a side surface of the second horizontal component 116 for engaging a grommet side block connection means 170 for a grommet side block 172.

The grommet side block 172 includes a first receptacle 174 in a side surface extending through the grommet side block 172 for engaging and holding the grommet side block connection means 170 to connect the grommet side block 172 to a side surface of the second horizontal component 116. The grommet side block 172 further includes a rectangular notch 176 on a side surface of the grommet side block

172 for engaging and holding the grommet side block 172 onto the side surface of the second horizontal component 116.

The grommet side block 172 further includes a second threaded receptacle 178 in a top surface of the grommet side block 172 to engage and hold a fifth adjustment handle connection means 180. The fifth adjustment handle connection means 180 includes a threaded component with a threaded first receptacle **18*a* in a top surface for accepting and engaging a fifth adjustment handle threaded connection means 18*a*4 on a fifth adjustment handle 18*a*6. The fifth adjustment handle connection means 180 further includes a second threaded receptacle 188 in a bottom surface for accepting and engaging a second grommet connection means 190. The second grommet connections means 190 is inserted into the second threaded receptacle 188 in the bottom surface of fifth adjustment handle connection means 180 to allow for adjustment of a second grommet 192. The second grommet 192 includes a central receptacle 194 for accepting and engaging a second grommet second connection means 198. A second grommet washer 200 makes the connection of the second grommet 192 more secure and prevents slippage of the second grommet 194 when holding down the second horizontal component 116 on the top surface 14*t* of the cutting saw 14**.

The grommet side block 172 with the second grommet 192 provides additional downward clamping pressure on the second clamping component 115 on the top surface of the cutting saw 14 and also provides additional pressure resistance of torquing and vibration forces caused by the cutting blade 20 of the cutting saw 14.

In one embodiment, the first grommet 162 and the second grommet 192 include a rubber, plastic, composite material and/or other types of soft, flexible materials that will not damage a surface of the material being cut **22*b*. However, the present invention is not limited to such embodiments and materials for the first grommet 162 and the second grommet 192** can be used to practice the invention.

In one embodiment, the first, second and third adjustment handles 72, 92 and 130 include gripping handles. However, the present invention is not limited to such an embodiment and other types of the adjustment handles can be used to practice the invention.

Figure 12:
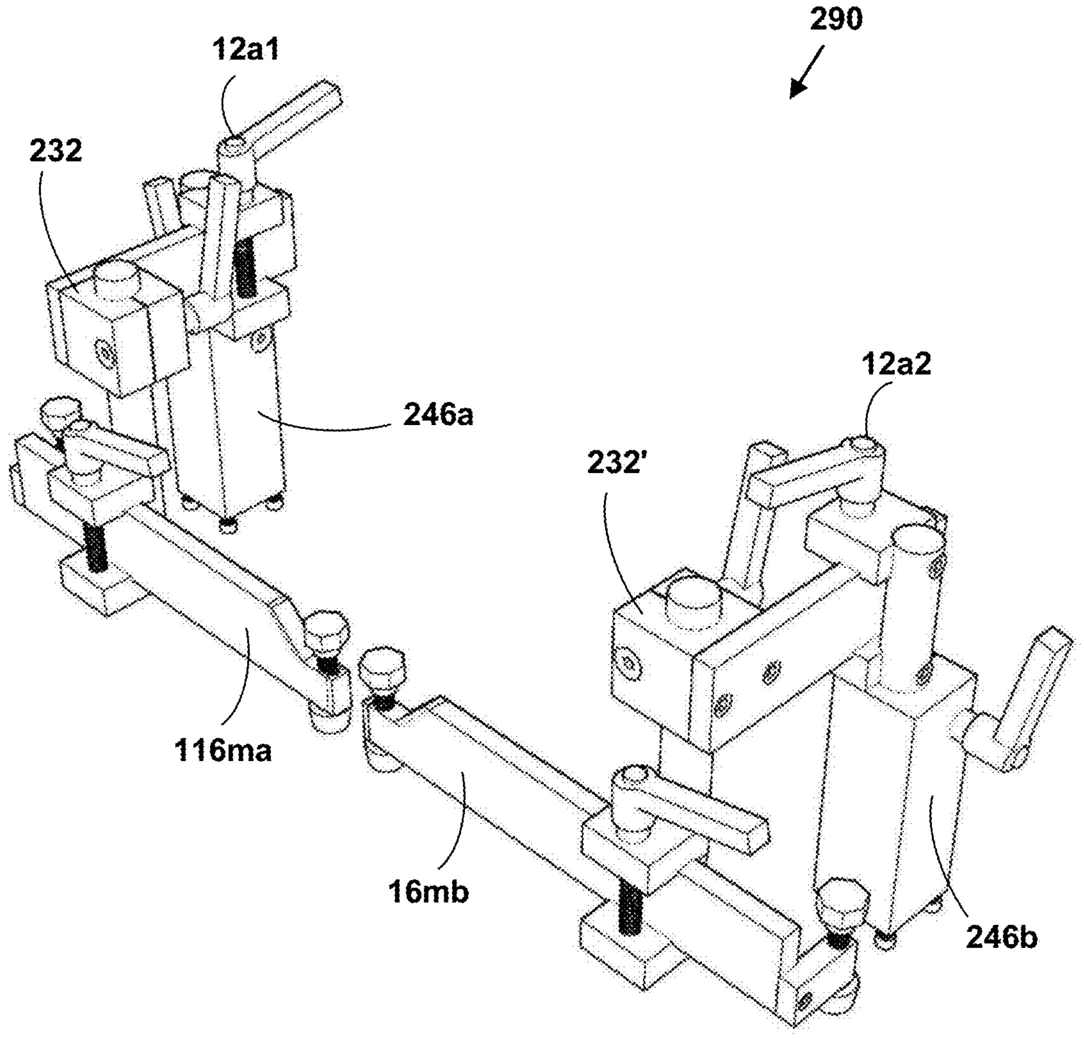
FIG. 12 is a block diagram illustrating a perspective view of cutting protection guide for cutting tools.
Figure 13:
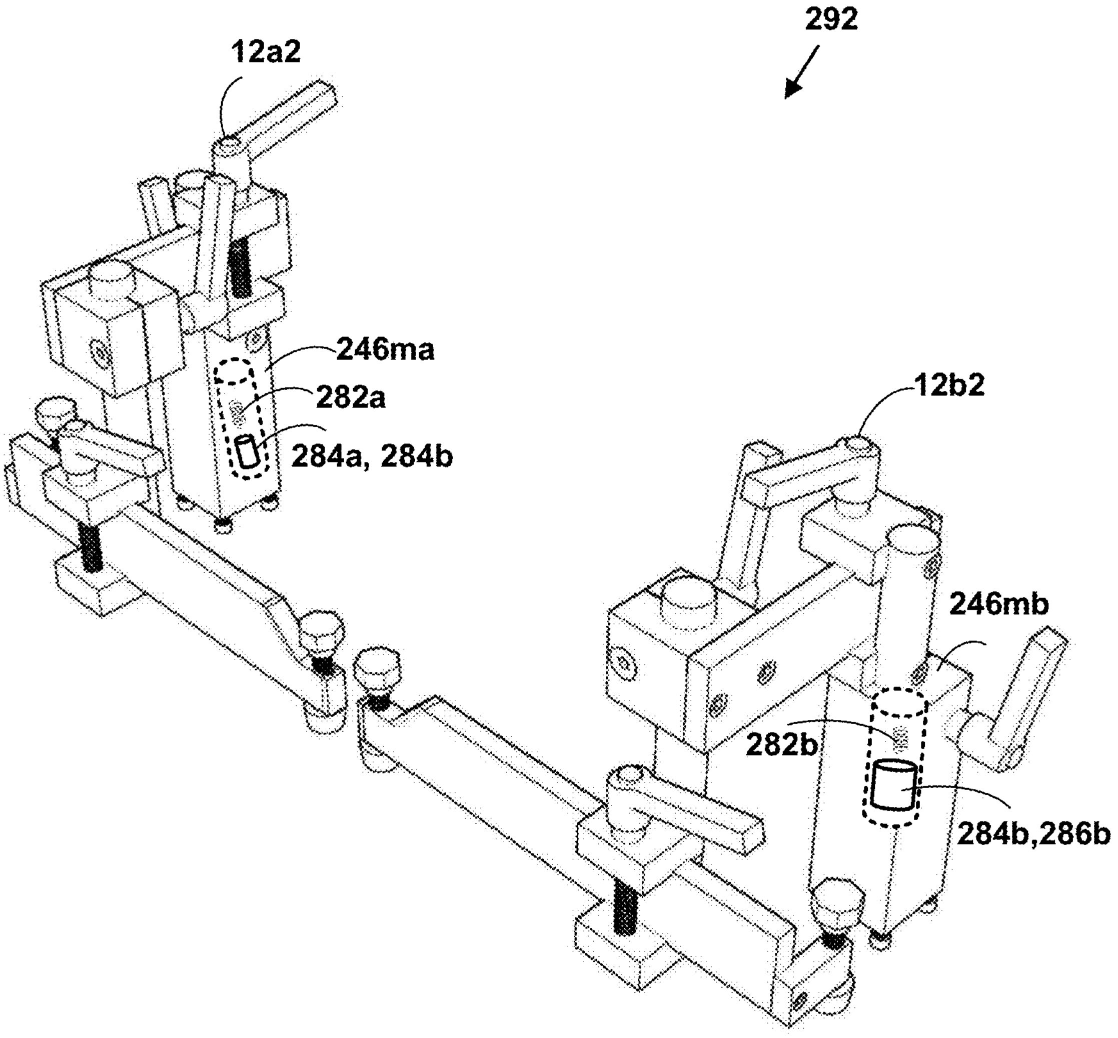
FIG. 13 is a block diagram illustrating a perspective view of clamping components of the cutting protection guide for cutting tools.
Figure 15:
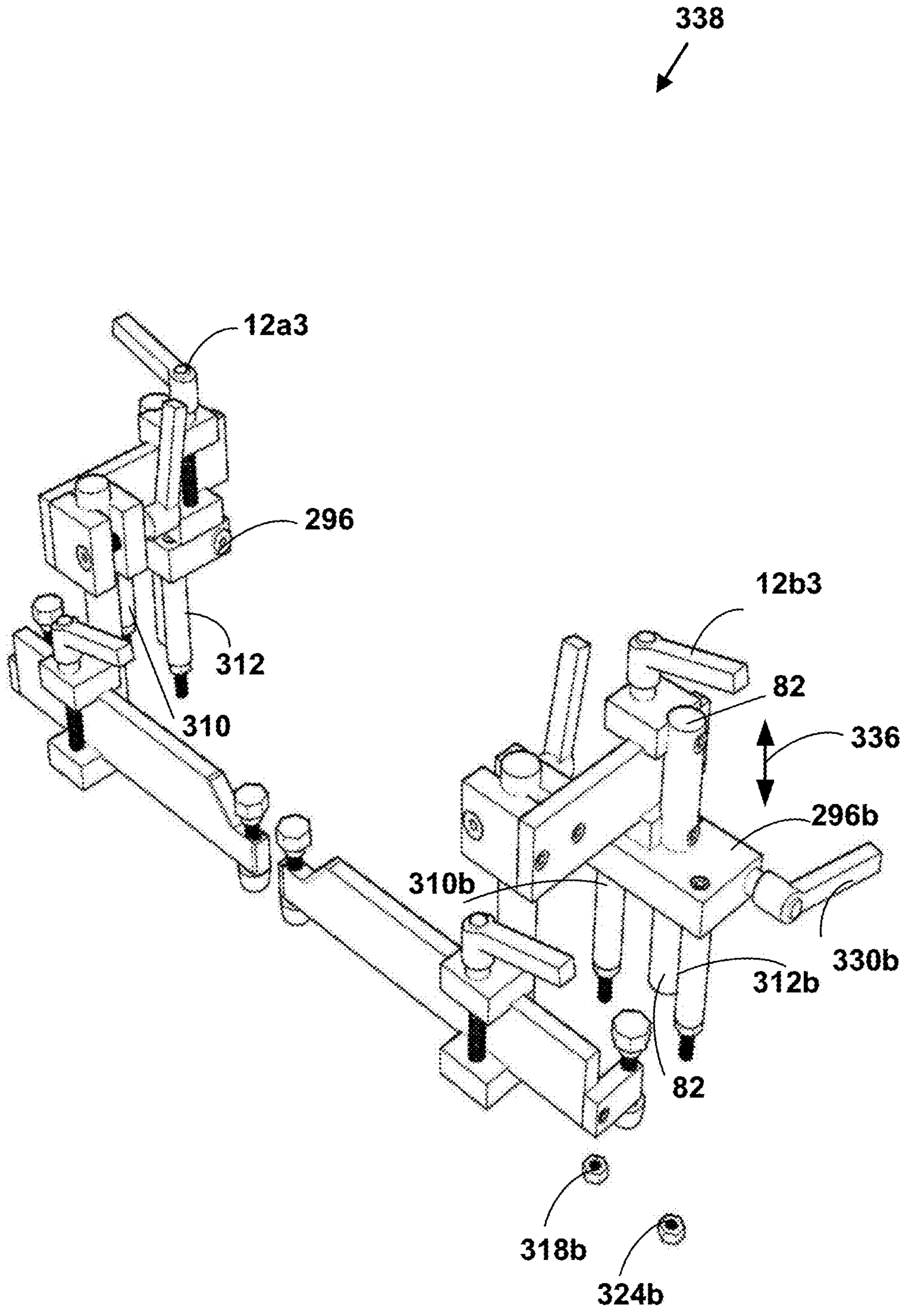
FIG. 15 is a block diagram illustrating a perspective view of cutting protection guide for cutting tools.

In one embodiment, the second handle 92 is reversible can be connected via the first side clamping component block 78 instead of the second side clamping block 96 and/or via an opposite side of the single clamping block 232 as illustrated in FIGS. 12, 13 and 15. However, the present invention is not limited to such an embodiment and other types of the adjustment handles can be used to practice the invention.

In one embodiment, the fourth and fifth adjustment handles 154, **18*a*6 include nob handles. In such an embodiment, nob handles are preferred so the fourth adjustment handle 154 can micro-adjust (e.g., to tolerances of about 0.1 in or about 0.254 cm) the first grommet 162. In addition, the fourth and fifth adjustment handles 154, 186 as nob handles do not interfere with the clamping and/or cutting of the materials 22*b* to be cut. However, the present invention is not limited to such embodiments, and other types of fourth and fifth adjustment handles 154, 18*a*6** can be used to practice the invention.

In one embodiment, first, second, third, fourth and fifth adjustment handles 72, 92 130 154, **18*a*6 include nob handles. In another embodiment, the first, second, third, fourth and fifth adjustment handles 72, 92 130 154, 18*a*6 include gripping handles. In another embodiment the first, second, third, fourth and fifth adjustment handles 72, 92 130 154, 18*a*6** include various combinations of nob and gripping handles. However, the present invention is not limited to such an embodiment and other types of the adjustment handles can be used to practice the invention.

Figure 4:
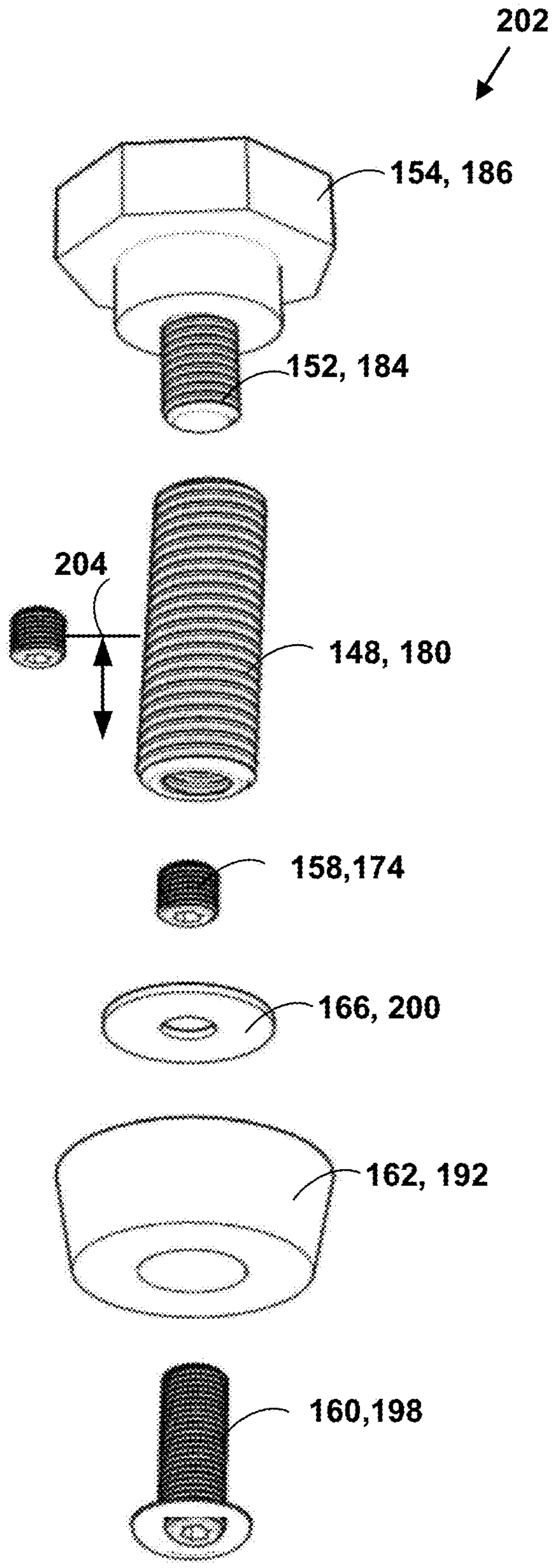
FIG. 4 is a block diagram illustrating a perspective view of selected components of the cutting protection guide for cutting tools.

FIG. 4 is a block diagram 202 illustrating a perspective view of selected components of the cutting protection guide for cutting tools.

FIG. 4 illustrates additional details components of fourth and fifth adjustment handles 154, **18*a*6. The first grommet connection means 158 and the second grommet connection means 190 are adjusted to various levels 204 within the fourth adjustment handle connection means 148 and the fifth adjustment handle connection means 180**.

Figure 5:
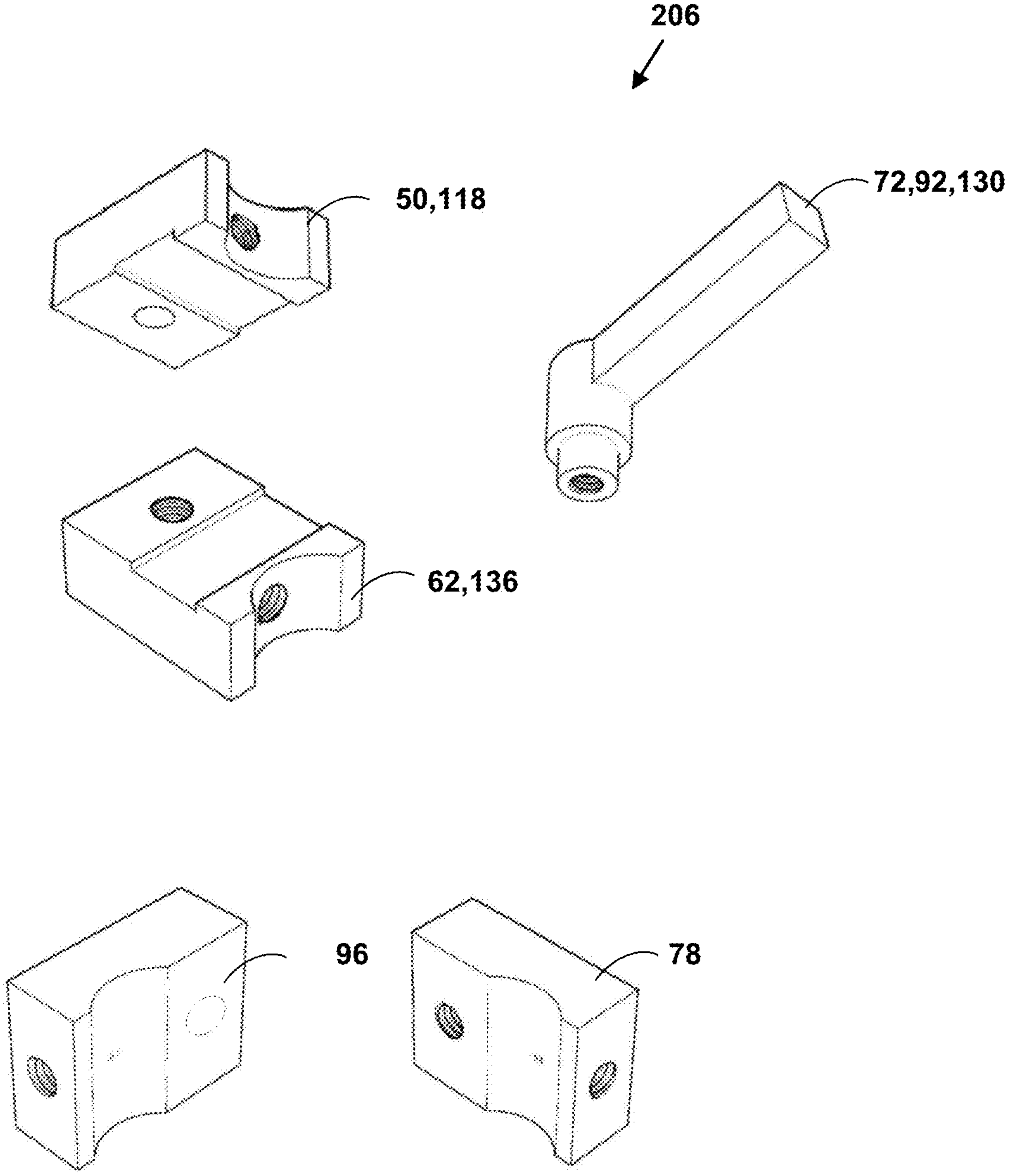
FIG. 5 is a block diagram illustrating a perspective view of selected components of the cutting protection guide for cutting tools.

FIG. 5 is a block diagram 206 illustrating a perspective view of selected components of the cutting protection guide for cutting tools.

FIG. 5 illustrates additional details of the first, second and third adjustment handles 72, 92, 130, first side block 78 and second side block 98, first bottom clamping block 62 and second bottom block 136 and first top clamping block 50 and second top clamping block **118*a***.

Figure 6:
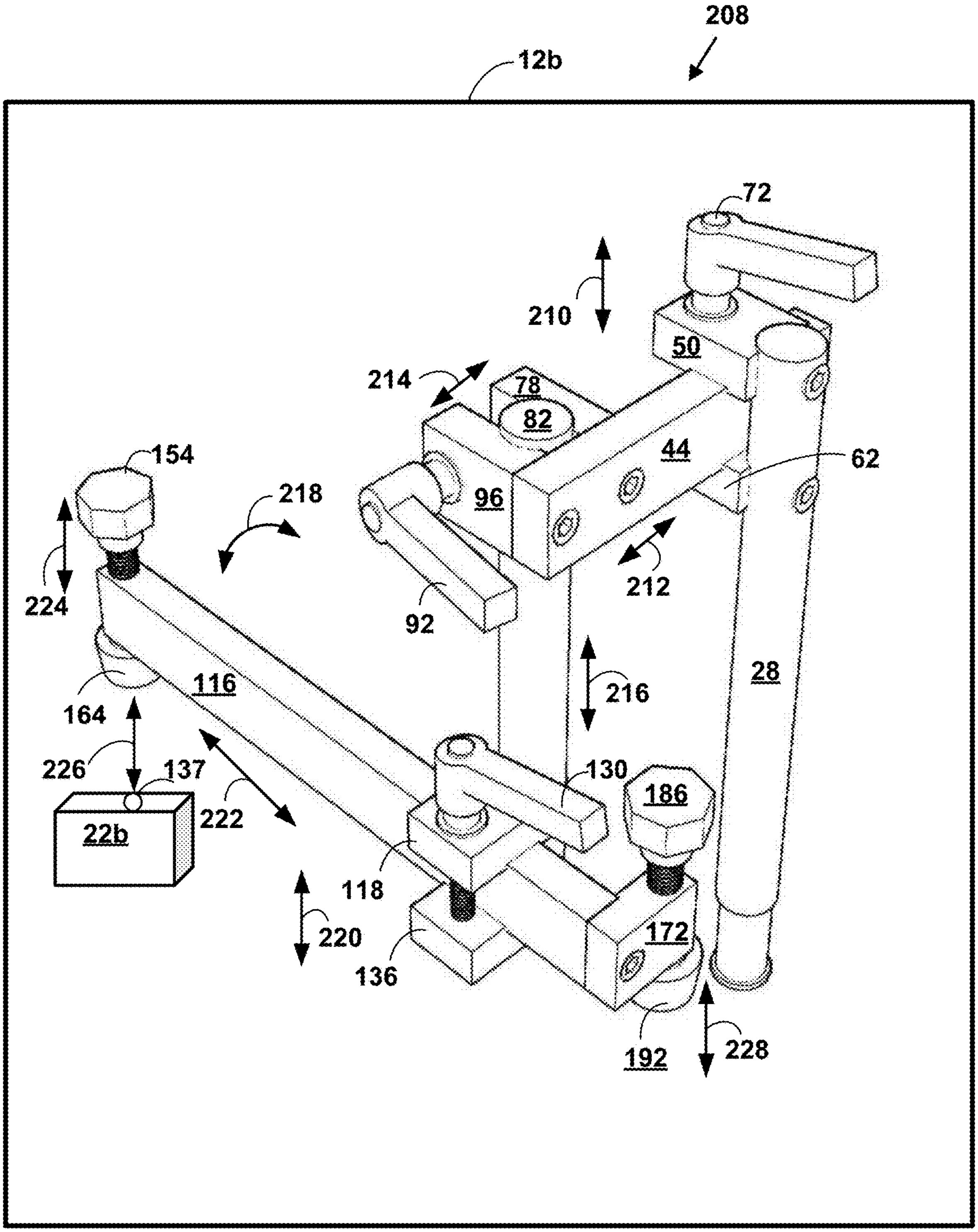
FIG. 6 is a block diagram illustrating a perspective view of cutting protection guide for cutting tools.

FIG. 6 is a block diagram 208 illustrating a perspective view of cutting protection guide for cutting tools.

In FIG. 6, the first adjustment handle 72 when rotated clockwise to tighten puts downward vertical pressure 210 on the first top clamping block 50 and upward vertical pressure on the first bottom clamping block 62 to securely hold the first horizontal connection component 44 in place on the saw mounting component 28. The first adjustment handle 72 when rotated clockwise to loosen, releases the downward vertical pressure 210 on the first top clamping block 50 and upward vertical pressure on the first bottom clamping block 62 to release the first horizontal connection component 44 on the saw mounting component 26 so it can be dynamically adjusted back and forth horizontally 212 to move the first horizontal clamping component 114 and second horizontal clamping component 116 closer to and farther away from the cutting blade 20 of the cutting saw 14 and/or the zero-clearance fence **16*b* to securely hold materials 22*b*** to be cut of varying widths.

In FIG. 6, the second adjustment handle 92 when rotated clockwise to tighten puts sideways horizontal pressure 214 on the second side clamping component block 96 and sideways horizontal pressure 214 on the first side clamping component block 78 to securely hold the first side clamping component block 78 and the second side clamping component block 96 securely on the vertical support component 82. The second adjustment handle 96 when rotated counter-clockwise to loosen, releases the sideways horizontal pressure 214 on the first side clamping component block 78 and sideways horizontal pressure 214 on the second side clamping component block 96 to allow vertical movement 216 up and down vertically on the vertical support component 82 so it can be dynamically adjusted up and down vertically 216 to move the second horizontal clamping component 116 up and down vertically 216 to securely hold materials **22*b*** to be cut of varying heights.

In FIG. 6, the second adjustment handle 92 when loosened, also allows the second horizontal clamping component 116 to be rotated horizontally along an arc curve **218*a* (e.g., about zero degrees to about 180 degrees or more) around the vertical support component 82 to securely hold materials 22*b* to be cut at a desired angle (e.g., about zero degrees to about 180 degrees or more) by the saw blade 20 on the cutting saw 14**.

In FIG. 6, the third adjustment handle 130 when rotated clockwise to tighten puts downward pressure 220 on the second top clamping block 118*a* and upward pressure 220 on the second bottom clamping block 136 to securely hold the second horizontal clamping component 116 in place. The third adjustment handle 160, when rotated counterclockwise to loosen, releases the downward pressure 220 on the second top clamping block 118*a* and upward pressure 220 on the second bottom clamping block 136 to allow the second horizontal clamping component 116 to move horizontally 22*a* back and forth to allow movement of the second horizontal clamping component 116 closer to and farther away from the cutting blade 20 of the cutting saw 14 securely hold materials 22*b* to be cut.

In FIG. 6, the horizontal movement 22*a* of the second horizontal clamping component 116 is perpendicular to the horizontal movement 212 of the first horizontal clamping block 44.

In FIG. 6, the fourth adjustment handle 154 when rotated clockwise to tighten, puts downward pressure 222 on the first grommet 164 to securely hold 22*a* materials 22*b* to be cut at a very precise connection point 137. When the fourth adjustment handle 154 is rotated counterclockwise to loosen, the downward pressure 224 on the first grommet 164 is released allowing materials 22*b* to be cut to be removed and/or moved to another desired position for cutting by the saw blade 20 on the cutting saw 14.

In FIG. 6, the fifth adjustment handle 18*a*6 when rotated clockwise to tighten, puts downward pressure 228 on the second grommet 192 to securely the second horizontal component 116 in place on a top surface 14*t* of the cutting saw. The second grommet 194 helps to further absorb torquing movements and vibrational movements caused by the cutting blade 20 of the cutting saw when the materials to be cut are cut. When the fifth adjustment handle 18*a*6 is rotated counterclockwise to loosen, the downward pressure 228 on the grommet 136 is released allowing easy movement of the second horizontal component 116 on the top surface 14*t* of the cutting saw.

Figure 7:
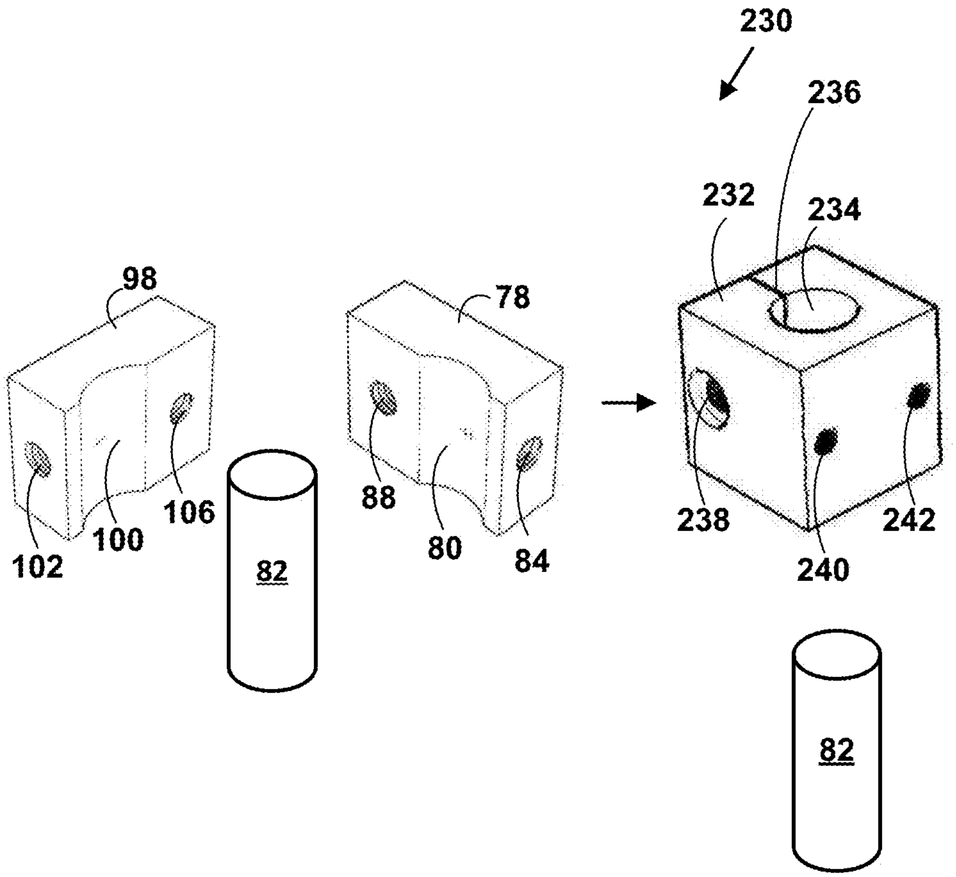
FIG. 7 is a block diagram illustrating a perspective view of clamping components of the cutting protection guide for cutting tools.

FIG. 7 is a block diagram 230 illustrating a perspective view of components of the cutting protection guide for cutting tools.

In one embodiment, in FIG. 7 the first side clamping component block 78 and the second side clamping block 98 are replaced with a single clamping block 232. The single clamping block 232 provides more stability and security and is less prone to slipping when engaging the vertical support component 82.

In FIG. 7, the single clamping block 232 includes a central receptacle 234 extending all the way through the single clamping block 232 for engaging the vertical support component 82. The single clamping block 232 further includes a vertical slit 236 to allow the single clamping block 232 to be compressed to a greater degree than a solid single clamping block. However, the invention can also be practiced with a solid single clamping block.

The single clamping block 232 further includes a first threaded receptacle 238 extending through the single clamping block for accepting and the engaging second adjustment handle connection means 90.

The single clamping block 232 further includes a second threaded receptacle 240 and third threaded receptacle 242 for accepting and engaging the first side block connection means 86 and the second side block connection means 104.

Figure 8:
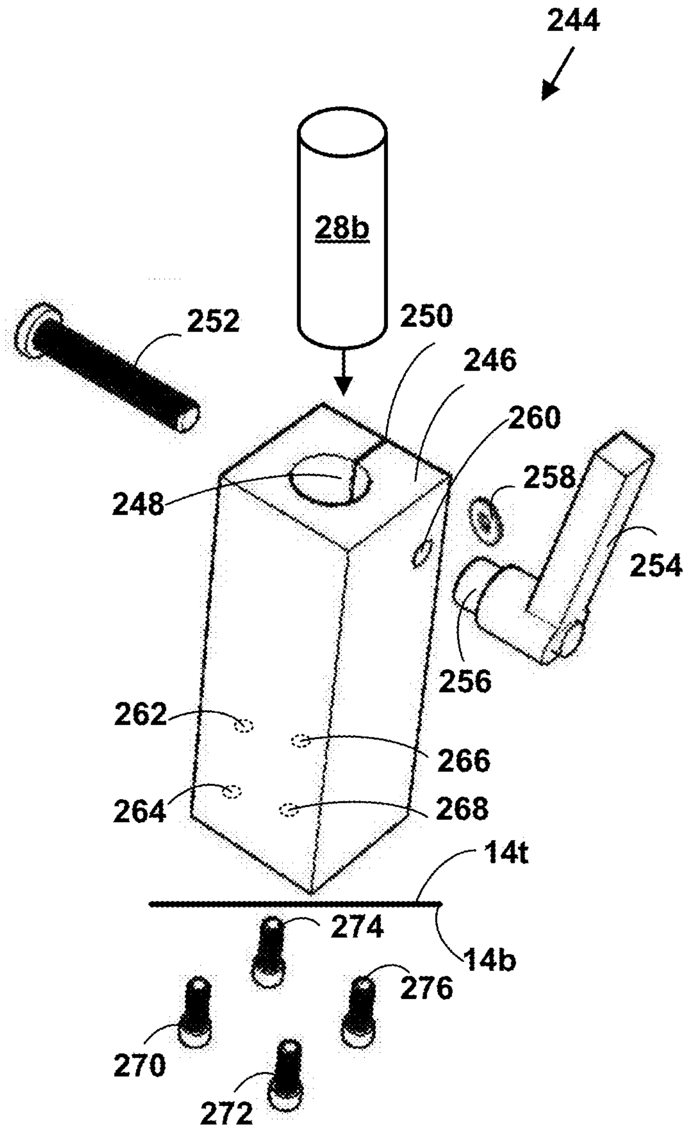
FIG. 8 is a block diagram illustrating a perspective view of clamping components of the cutting protection guide for cutting tools.

FIG. 8 is a block diagram 244 illustrating a perspective view of connection components of the cutting protection guide for cutting tools.

In FIG. 8, the first clamping component 15 further includes a single connection block 246 to fasten the first clamping component 15 to the cutting saw 14. In such an embodiment, the saw mounting component 28 is placed within the single connection block 246. The single connection block 246 provides additional stability and security and helps prevent the first clamping component 15 from spinning, turning and/or torquing on the cutting saw when materials 22*b* are cut and pressure is put on the materials 22*b* via the blade 20 of the cutting saw 14.

Figure 9:
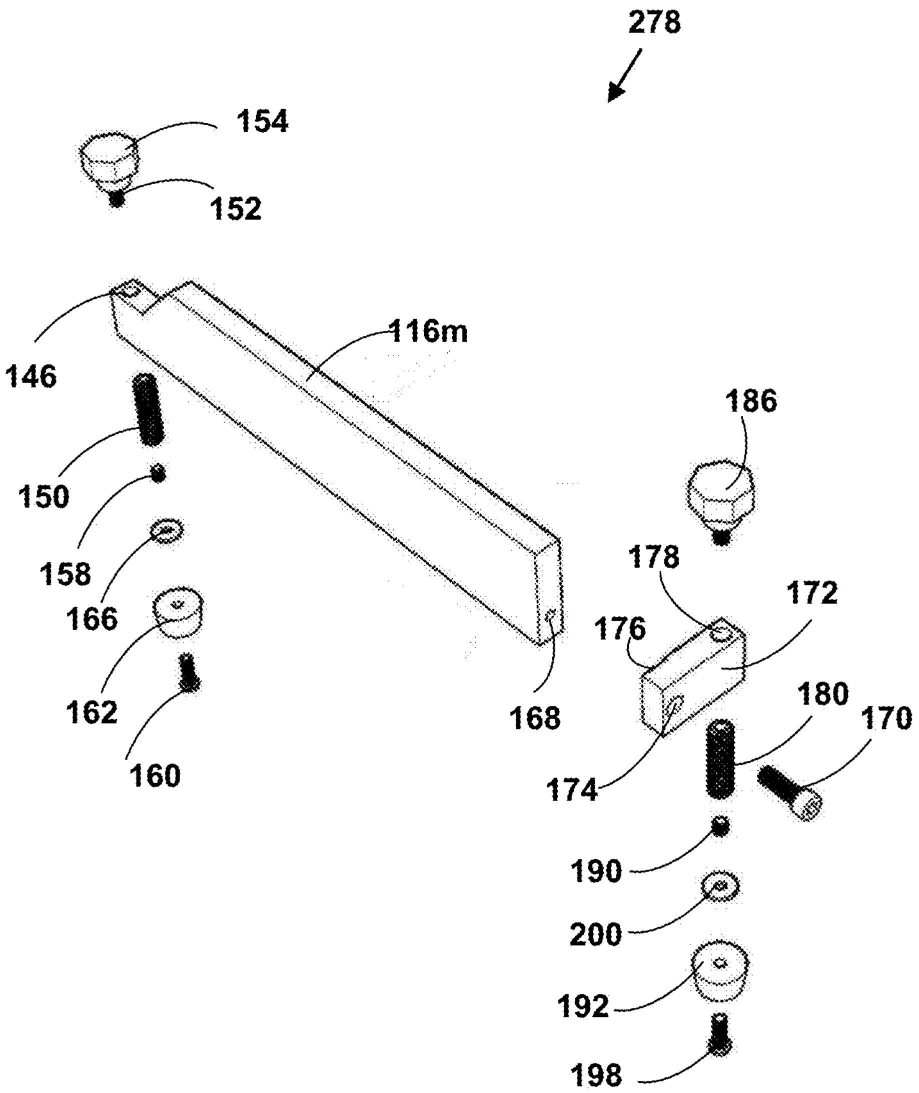
FIG. 9 is a block diagram illustrating an exploded view of cutting protection guide for cutting tools.

The single connection block 246 includes a central receptacle 248 for accepting and engaging a modified saw mounting component 26*b* (FIG. 9). The single connection block 246 further includes a vertical slit 250 to allow the single connection block 246 to be compressed to a greater degree than a solid the single connection block. However, the invention can also be practiced with a solid the single connection block.

The single connection block 246 further includes a single connection block connection means 252 for accepting and engaging a single connection block adjustment handle 254 with a threaded single connection block adjustment handle receptacle 256 and washer 258 for accepting and engaging the single connection block connection means 246 through a second receptacle 260. In one embodiment the second receptacle 256 includes a threaded receptacle. In another embodiment, the second receptacle 256 includes a partially threaded and/or a receptacle without threads. However, the present invention is not limited to such embodiments and other embodiments can be used to practice the invention.

In one embodiment, the single connection block connection means 252 includes a bolt, screw, rivet and/or other connection means. In FIG. 8, the single connection block connection means 252 includes a threaded screw with a round head including a hexagonal receptacle for engaging a hexagonal and/or ALLEN wrench. However, the present invention is not limited to such an embodiment and other embodiments can be used to practice the invention.

The single connection block 246 further includes four bottom receptacles 262, 264, 266, 268 for engaging and accepting four bottom connection means 270, 272, 274, 276. In such an embodiment, the cutting saw 14 includes plural mounting holes that are drilled during manufacture of the cutting saw 14. In another embodiment, plural mounting holes are drilled into the cutting saw 14 to allow use of the single connection block 246. However, the present invention is not limited to such an embodiment and other embodiments may be used to practice the invention.

In one embodiment, the four bottom connection means 270, 272, 274, 276 include a bolt, screw, rivet and/or other connection means. In FIG. 86, the four bottom receptacles 270, 272, 274, 276 include, not limited to threaded receptacles and the four bottom connection means 270, 272, 274, 276 are illustrated as threaded screws with protruding heads including a hexagonal receptacle for engaging a hexagonal and/or ALLEN wrench. However, the present invention is not limited to such embodiments and other connection means can be used to practice the invention.

In FIG. 8, the four bottom connection means 270, 272, 274, 276 extend through the bottom surface 14*b* and through the top surface 14*t* of the cutting saw to securely mount the single connection block 246 on the cutting saw 14. FIG. 8 illustrates four bottom receptacles 270, 272, 274, 276 and four bottom connection means 270, 272, 274, 276. However, the present invention is not limited to such an embodiment and more and/or fewer bottom connection receptacles and bottom connections means can be used to practice the invention.

FIG. 9 is a block diagram 278 illustrating a perspective view of clamping components of the cutting protection guide for cutting tools.

In one embodiment, in FIG. 9, the second horizontal clamping component 116 is replaced with a second version of the second horizontal clamping component 116*bm* with a notch removed from one end of the second horizontal clamping component 116*m*. In such an embodiment, the notch allows easier access to and easier operation of the fourth adjustment handle 154. However, the present invention is not limited to such an embodiment and other embodiments may be used to practice the invention.

Figure 10:
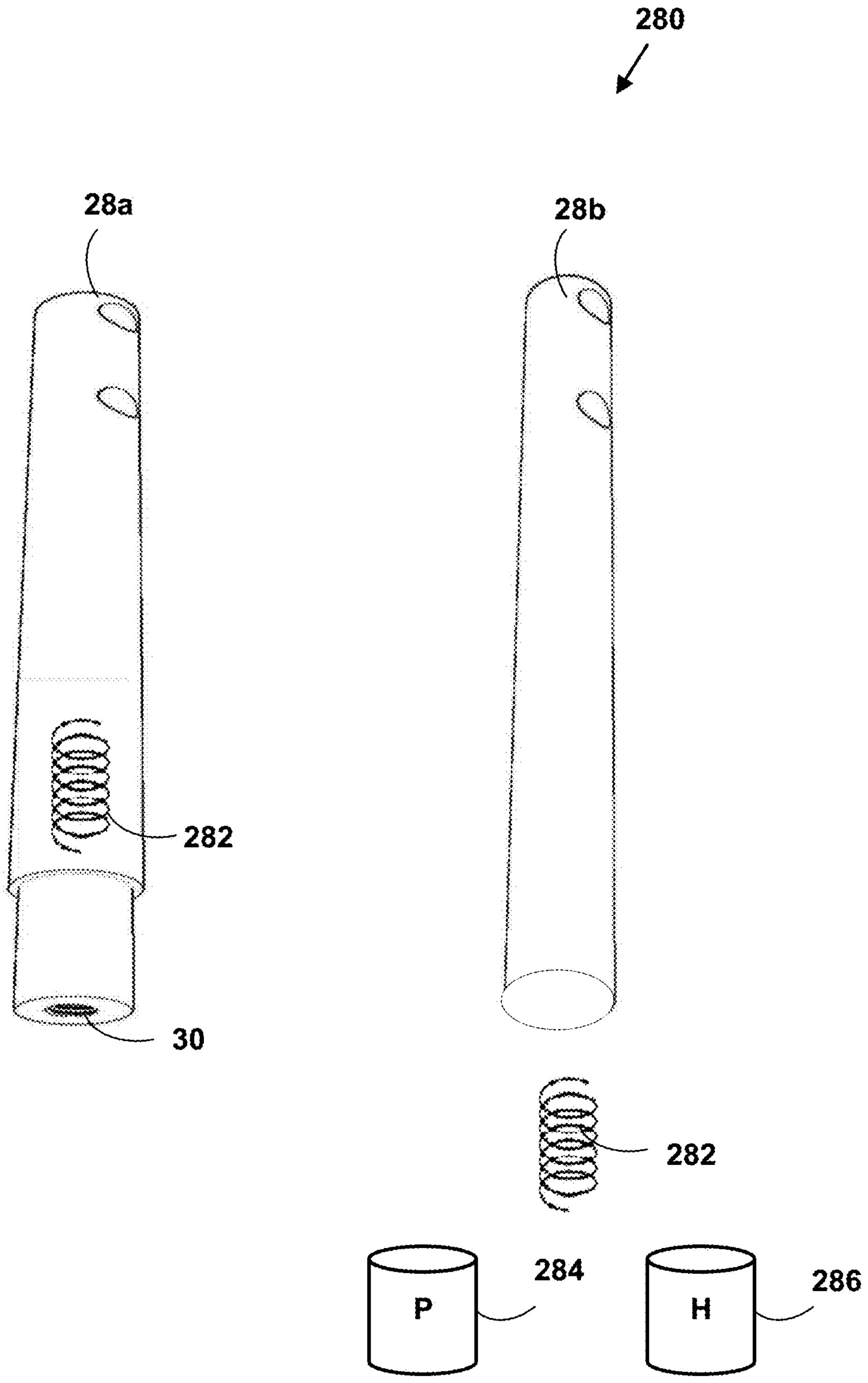
FIG. 10 is a block diagram illustrating a perspective view of cutting protection guide for cutting tools.

FIG. 10 is a block diagram 280 illustrating a perspective view of clamping components of the cutting protection guide for cutting tools.

In FIG. 10, in one embodiment, the saw mounting component 26 includes a saw mounting component 26*a* with a spring 282. In such an embodiment, the saw mounting component 26*a* with the spring 282 allows the cutting protection guide 12*a*, 12*b* to absorb vibrations from the current saw and add additional clamping pressure when the cutting protection guide 12*a*, 12*b* is clamped down a materials 22*a*, 22*b* to be cut. However, the present invention is not limited to such an embodiment and other embodiments can be used to practice the invention.

In FIG. 10, in one embodiment, the saw mounting component 26 includes a saw mounting component 26*b* without saw mounting receptacle 30. In such an embodiment, the saw mounting component 26*b* is insertable and removeable from single connection block 246 (FIG. 8). However, the present invention is not limited to such an embodiment and other embodiments can be used to practice the invention.

In FIG. 10, in one embodiment, the saw mounting component 26 includes a saw mounting component 26*b* without saw mounting receptacle 30. In such an embodiment, the saw mounting component 26*b* is insertable and removeable from single connection block 246 (FIG. 8) and further includes a spring 282, a pneumatic component 284 and/or a hydraulic component 286, which are also insertable and removeable from single connection block 246. The spring 282, pneumatic component 284 and/or a hydraulic component 286, allows the cutting protection guide 12*a*, 12*b* to further absorb vibrations from the current saw 14 and add additional clamping pressure when the cutting protection guide 12*a*, 12*b* is clamped down a materials 22*a*, 22*b* to be cut. However, the present invention is not limited to such an embodiment and other embodiments can be used to practice the invention.

In one embodiment, the pneumatic component 284 uses compressed air or gas, in order to move an actuator, and includes one or more air-driven pistons and/or one or more actuators to absorb shocks and vibrations from the cutting saw 14 when materials 22*a*, 22*b* are cut and/or also to apply additional clamping pressure for the cutting protection guide 12*a*, 12*b* when it is connected to the cutting saw 14. However, the present invention is not limited to such an embodiment and other embodiments can be used to practice the invention.

In one embodiment, the hydraulic component 286 uses compressed fluid, in order to move an actuator, and includes one or more fluid-driven pistons and/or one or more actuators to absorb shocks and vibrations from the cutting saw 14 when materials 22*a*, 22*b* are cut and/or also to apply additional clamping pressure for the cutting protection guide 12*b*3 when it is connected to the cutting saw 14. However, the present invention is not limited to such an embodiment and other embodiments can be used to practice the invention.

Figure 11:
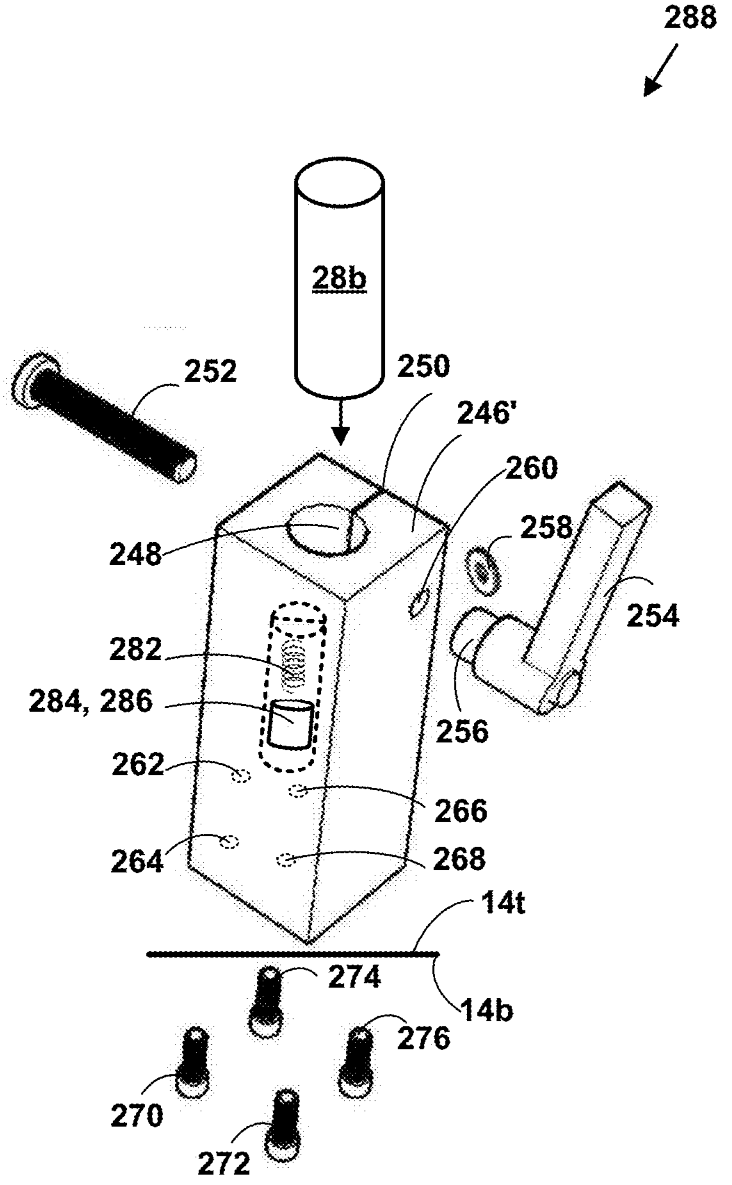
FIG. 11 is a block diagram illustrating a perspective view of clamping components of the cutting protection guide for cutting tools.

FIG. 11 is a block diagram 288 illustrating a perspective view of cutting protection guide for cutting tools.

FIG. 11 illustrates the saw mounting component 26*b* (FIG. 9) insertable and removeable from single connection block 246*a*, 246*b* (FIG. 8) including the spring 282, the pneumatic component 284 and/or the pneumatic component 284 within the central receptacle 248 of the single clamping block. However, the present invention is not limited to such an embodiment and other embodiments can be used to practice the invention.

FIG. 12 is a block diagram 290 illustrating a perspective view of clamping components of the cutting protection guide for cutting tools.

FIG. 12 illustrates the cutting protection guide 12*a*2, 12*b*2 for cutting tools. The cutting protection guide 12*a*2, 12*b*2 for cutting tools includes the single clamping block 232*a*, 232*b* (FIG. 7) the single connection block 246*a*, 246*b* (FIG. 8) and the modified second horizontal clamping component 116*ma*, 116*mb* (FIG. 9) in a complete format configured for use. However, the present invention is not limited to such an embodiment and other embodiments can be used to practice the invention.

FIG. 13 is a block diagram 292 illustrating a perspective view of cutting protection guide for cutting tools.

In FIG. 13, illustrates the cutting protection guide 12*a*2, 12*b*2 for cutting tools. The cutting protection guide 122*a*, 12*b*2 for cutting tools a modified single connection block 246*a*, 246*b* with the spring 282, pneumatic component 284 and/or the hydraulic component 286 for connecting the saw mounting component 26*b* to the cutting saw 14 in a complete format configured for use. However, the present invention is not limited to such an embodiment and other embodiments can be used to practice the invention.

Figure 14:
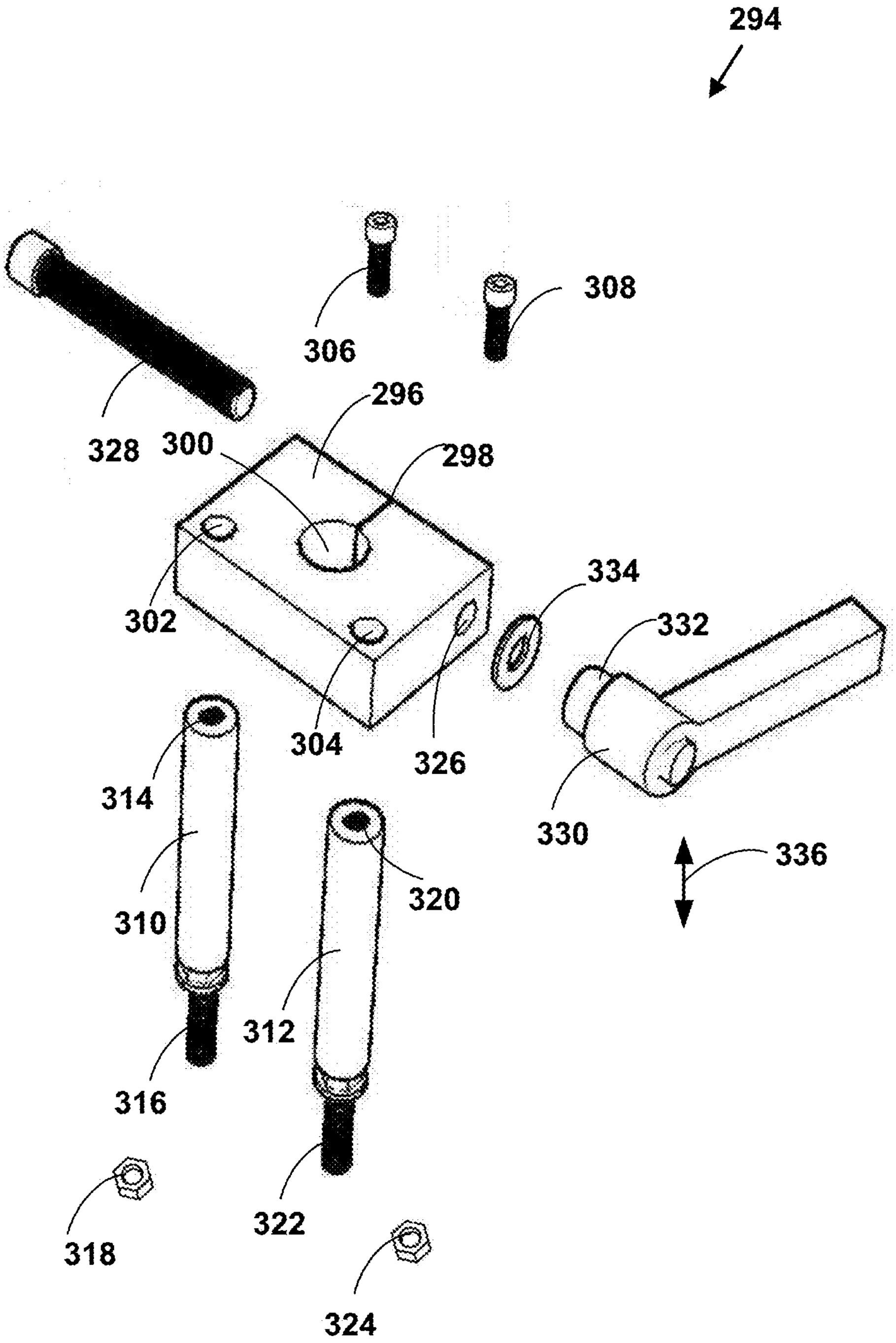
FIG. 14 is a block diagram illustrating a perspective view of cutting protection guide for cutting tools.

FIG. 14 is a block diagram 294 illustrating a perspective view of clamping components of the cutting protection guide for cutting tools.

FIG. 14 illustrates a second type of single connection block 296 for connecting the saw mounting component 26*b* to the cutting saw 14.

In FIG. 14, the second type of connection block 296, includes but is not limited to a vertical slit 298 to allow the second type of connection block 296 to be compressed to a greater degree than a solid second type of connection block 296. However, the invention can also be practiced with a solid second type of connection block 296.

The second type of connection block 296, further includes a central receptacle 300 in a top surface extending through the second type of connection block 296 to accept and engage the saw mounting component 26*b* to mount the cutting protection guide 12*b*3 to the cutting saw 14.

The second type of connection block 296 further includes a first receptacle 302 and a second receptacle 304 in the top surface and extending through the second type of connection block 296 for accepting and engaging a first connection means 306 and a second connection means 308. The first connection means 306 and the second connection means 308 engaging a first mounting component 310 and a second mounting component 312 for connecting the second type of connection block 296 to the cutting saw 14. The first mounting component 310 and the second mounting component 312 are extension components raising the second type of connection block 296 to a different higher vertical height to cut materials 22*a*, 22*b* of a larger widths, heights and thicknesses and providing a different mounting system for the saw mounting component 26*b*.

In FIG. 14, the first connection means 306 and the second connection means 308 include but are not limited to, a bolt, screw, rivet and/or other connection means. In FIG. 14, the first connection means 306 and the second connection means 308 are illustrated as threaded screws with protruding heads including a hexagonal receptacle for engaging a hexagonal and/or ALLEN wrench. In one embodiment, the first connection means 306 and the second connection means 308 are partially threaded. However, the present invention is not limited to such an embodiment and other embodiments may be used to practice the invention.

The first mounting component 310 includes a threaded receptacle 312 and/or partially threaded receptacle in a top surface for accepting and engaging the first connection means 306 that includes a threaded screw and includes a threaded connection component 316 with a hexagonal head for providing connection support on the top surface 14*t* of the cutting saw 14 and for engaging a wrench to hold the threaded component 316 as it is rotated into a threaded receptacle on a top surface 14*t* of the cutting saw 14. In another embodiment, first mounting component 310 is placed in a smooth receptacle and/or partially threaded receptacle on a top surface 14*t* of the cutting saw 14 and attached with a nut 318*a*. However, the present invention is not limited to such an embodiment and other embodiments may be used to practice the invention.

The second mounting component 312 includes a threaded receptacle 320 and/or partially threaded receptacle in a top surface for accepting and engaging the second connection means 308 that includes a threaded screw and includes a threaded connection component 322*a* with a hexagonal head for providing connection support on the top surface 14*t* of the cutting saw 14 and for engaging a wrench to hold the threaded component 322*a* as it is rotated into a threaded receptacle on a top surface 14*t* of the cutting saw 14. In another embodiment, second mounting component 322*a* is placed in a smooth receptacle on a top surface 14*t* of the cutting saw 14 and attached with the nut 324. However, the present invention is not limited to such an embodiment and other embodiments may be used to practice the invention.

The first mounting component 310 and the second mounting component 312 allow the cutting protection guide 12*b* to be placed on a cutting saw 14 with another type and configuration of pre-drilled receptacles on a top surface 14*t* of the cutting saw 14 when the cutting saw is manufactured and/or have additional new holes drilled in the cutting saw 14 after the saw is manufactured.

The second type of connection block 296, further includes a third receptacle 326 extending through a side surface for accepting and engaging an adjustment handle connection means 328 to connect an adjustment handle 330 including a threaded receptacle 332 for accepting and engaging the adjustment handle connection means 328 with a washer 334.

The adjustment handle 330 allows the second type of connection block 296 to be tightened and loosened to allows the saw mounting component 26*b* to be moved up and down vertically 336 and to move the whole cutting protection guide 12*b*3 (FIG. 15) up and down vertically 336 and the cutting saw 14.

In FIG. 14, the adjustment handle connection means 328 includes but is not limited to, a bolt, screw, rivet and/or other connection means. In FIG. 15, the adjustment handle connection means 328 is illustrated as a threaded screw with a round head including a hexagonal receptacle for engaging a hexagonal and/or ALLEN wrench. However, the present invention is not limited to such an embodiment and other embodiments may be used to practice the invention.

FIG. 15 is a block diagram 338 illustrating a perspective view of cutting protection guide for cutting tools.

FIG. 15 illustrates the cutting protection guide 12*a*3, 12*b*3 for cutting tools. The cutting protection guide 12*a*3, 12*b*3 for cutting tools includes the second type of single connection block 296*a*, 296*b* for connecting the saw mounting component 26*b* to the cutting saw 14 in a complete format configured for use.

In FIG. 15, the first mounting component 310 and the second mounting component 312 allow additional space for the whole cutting protection guide 12*b*3 to be moved up and down vertically 266 on the modified saw mounting component 26*b* (FIG. 9) on the cutting saw 14 via tightening and loosening the adjustment handle 330.

In one embodiment, the cutting protection guides 12*a*, 12*b* are reversible and can be used by users who are both right-handed and left-handed for cutting materials 22*a*, 22*b* on the cutting saw 14.

Figure 16:
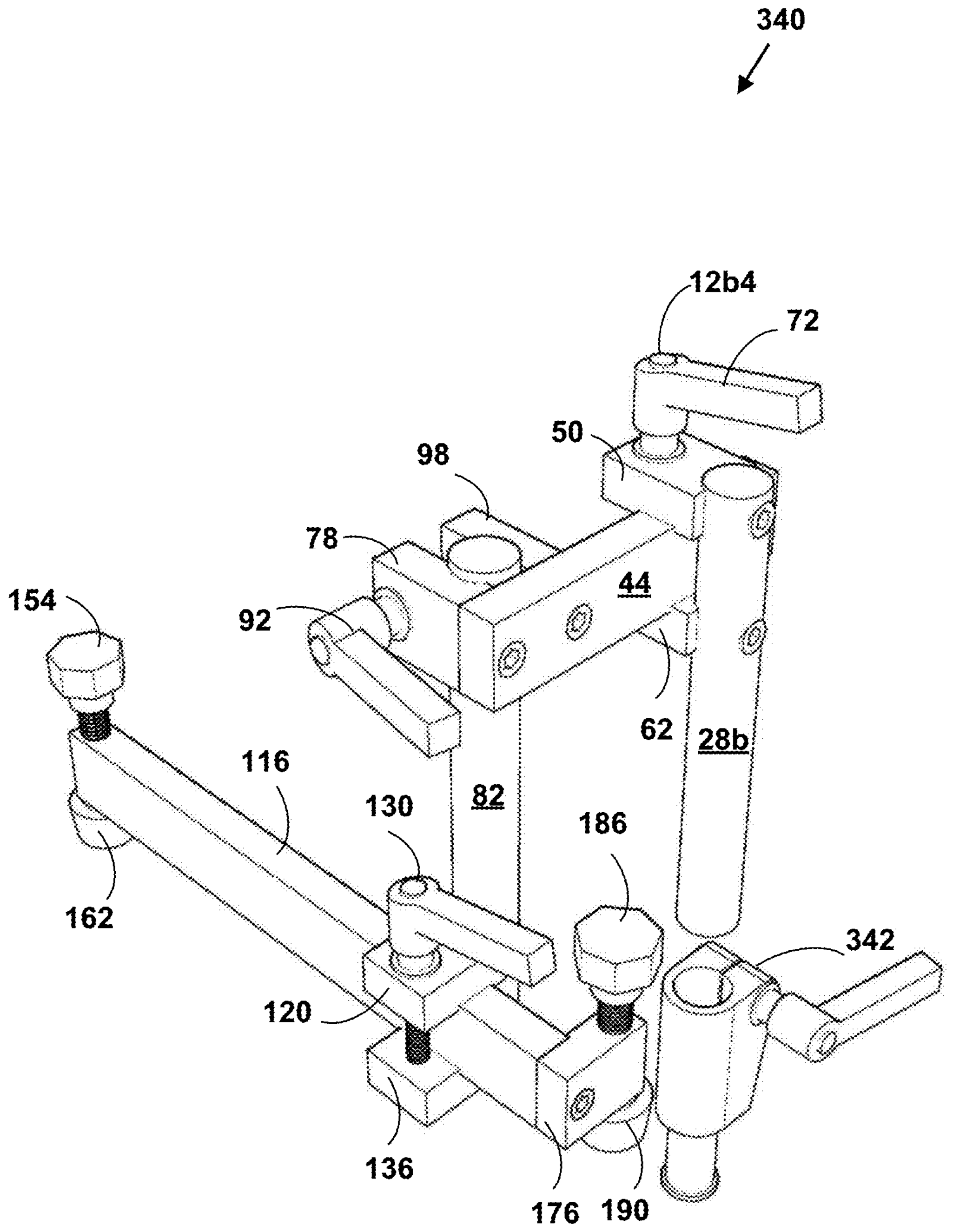
FIG. 16 is a block diagram illustrating a perspective view of clamping components of the cutting protection guide for cutting tools.

FIG. 16 is a block diagram 340 illustrating a perspective view of clamping components of the cutting protection guide for cutting tools.

FIG. 16 illustrates cutting protection guides 12*b*4 including the vertical saw mounting component 28*b* with quick release mounting component 342*a*, 342*b* that allows the cutting protection guides 12*a*4, 12*b*4 to be quickly added and removed from the cutting saw 14. In FIGS. 1-16, the cutting protection guides 12*a*, 12*b* are mounted to the cutting saw 14 with a screw or a bolt and requires a hand tool (e.g., screw driver, wrench, etc.) to remove. Quick release mounting component 342*a*, 342*b* that allows the cutting protection guides 12*a*4, 12*b*4 to be quickly added and removed from the cutting saw 14.

Figure 17:
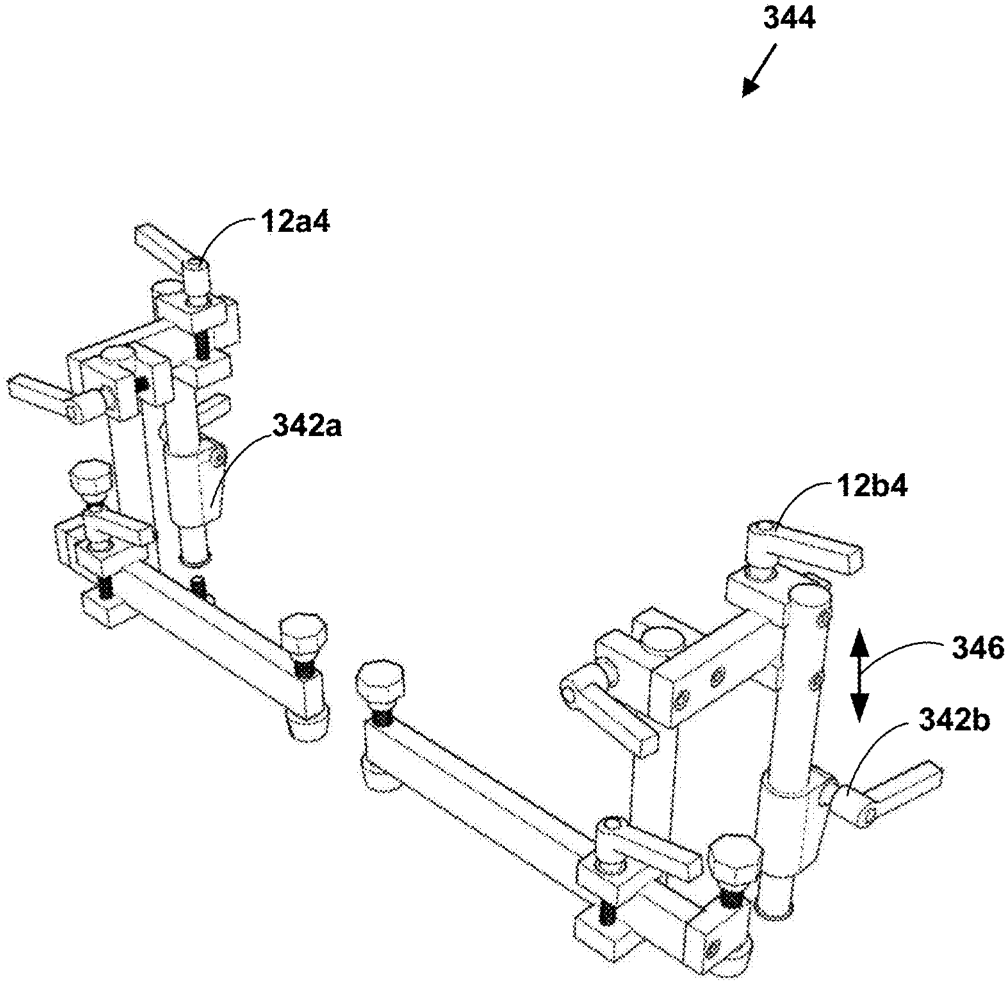
FIG. 17 is a block diagram illustrating a perspective view of clamping components of the cutting protection guide for cutting tools.

FIG. 17 is a block diagram 344 illustrating a perspective view of clamping components of the cutting protection guide for cutting tools.

FIG. 17 illustrates the cutting protection guides 12*a*4, 12*b*4 including the vertical saw mounting component 28*b* with quick release mounting component 342*a*, 342*b* that allows the cutting protection guides 12*a*4, 12*b*4 to be quickly added and removed from the cutting saw 14. The quick release mounting component 342*a*, 342*b* also allows the cutting protection guides 12*a*4, 12*b*4 to be moved up and down vertically 346 on the cutting saw allowing the cutting saw 14 to cut materials to be cut 22*a*, 22*b* of larger widths and heights.

Figure 18:
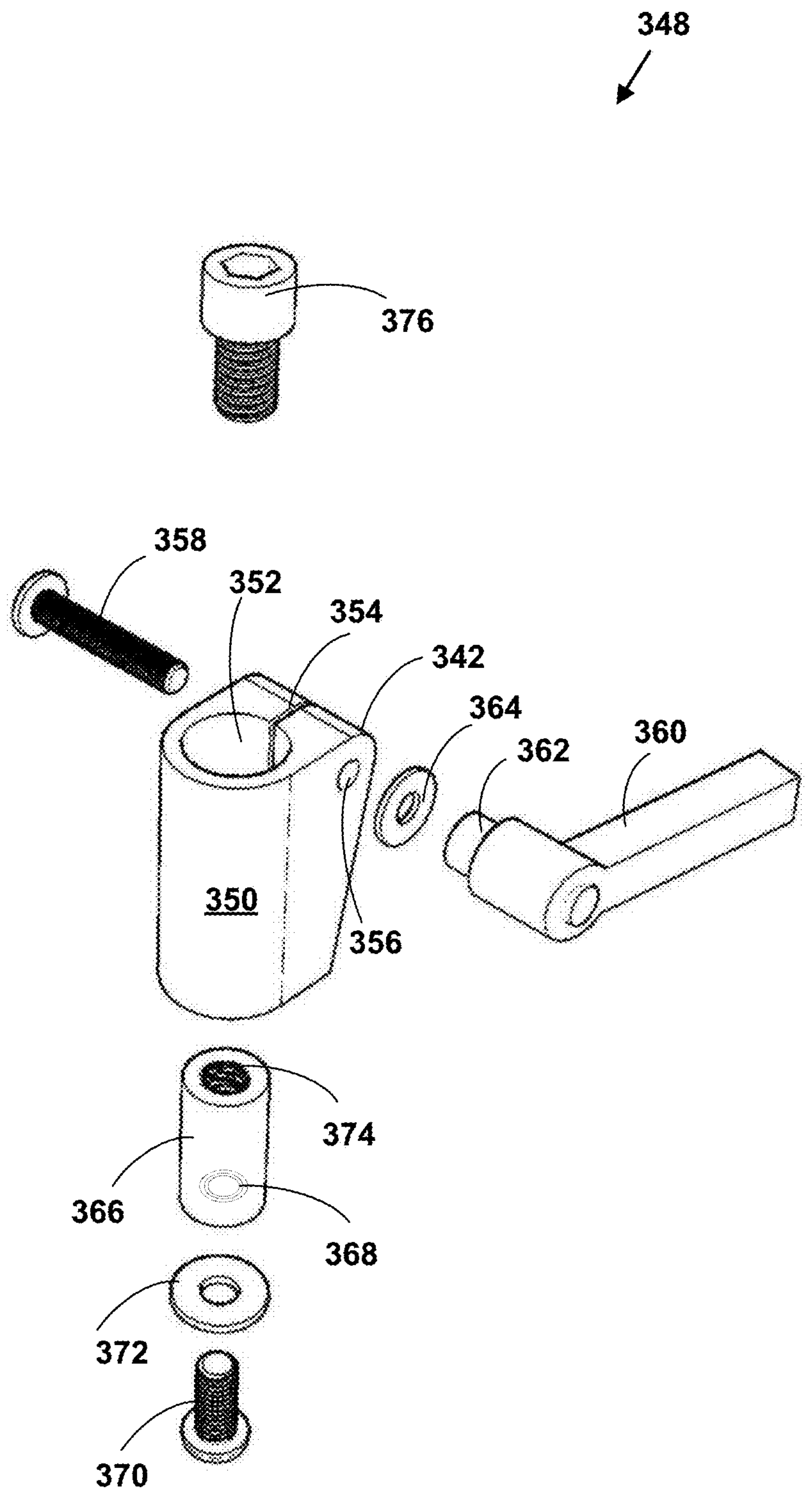
FIG. 18 is a block diagram illustrating a perspective view of clamping components of the cutting protection guide for cutting tools.

FIG. 18 is a block diagram 348 illustrating a perspective view of clamping components of the cutting protection guide for cutting tools.

In FIG. 18, the quick release mounting component 342 includes a body component 350 with a central receptacle 352 for engaging, securely holding and releasing the vertical saw mounting component 28*b*. The body component 350 further includes a vertical slit 354 to allow the body component 350 to be compressed to a greater degree than a solid body component 350. However, the invention can also be practiced with a solid body component 350. The body component 350 further a side receptacle 356 in a side surface extending through the body component 350 for accepting and engaging a sixth handle connection means 358. The sixth handle connection means 358 includes bolts, screws, rivets and/or other types of connection means. The sixth handle connection means 358 is illustrated as a threaded screw with a rounded head including a hexagonal receptacle for engaging a hexagonal and/or ALLEN wrench. In another embodiment, the side receptacle 356 and the sixth handle connection means 358 are partially threaded. However, the present invention is not limited to such embodiments and other connection means can be used to practice the invention.

The sixth handle connection means 358 is feed through the side receptacle 356 to engage a sixth adjustment handle 360 with a threaded receptacle 362 for accepting and engaging the sixth handle connection means 358 including a washer 364. The sixth adjustment handle 360 adjusts tension of the body component 350 by rotating the sixth adjustment handle 360 clockwise to tighten and counterclockwise to loosen sideways pressure on body component 350. The sixth adjustment handle 360 adjusts a vertical position of the cutting protection guides 12*b*4 on the top surface 14*t* of the cutting saw 14*j* and allows quick release and removal of the cutting protection guide 12 from the cutting saw 14. The quick release mounting component 342*b*, 342*b* also allows the cutting protection guide 12*b*4 to be moved up and down vertically 346 on the cutting saw allowing the cutting saw 14 to cut materials to be cut 22*a*, 22*b* of larger widths and heights. However, the present invention is not limited to such embodiments other embodiments be used to practice the invention.

The quick release mounting component 342*b* further includes a cutting saw 20 connection component 366 with a bottom threaded central receptacle 368 in a bottom surface of the cutting saw 20 connection component 366 or accepting a sixth saw connection component connection means 370 with washer 372 to securely mount the cutting saw 20 connection component 366 of the quick release mounting component 342*b* to a bottom surface 14*b* of the cutting saw 14. The sixth saw connection component connection means 370 is illustrated as a threaded screw with a rounded head including a hexagonal receptacle for engaging a hexagonal and/or ALLEN wrench. In another embodiment, the side receptacle 368 and the sixth saw connection component connection means 370 are partially threaded. However, the present invention is not limited to such embodiments and other connection means can be used to practice the invention.

The cutting saw 20 connection component 366 further includes with a top threaded central receptacle 374 in a top surface of the cutting saw 20 connection component 366 for engaging a second saw connection component connection means 376 for connecting the body component 350 to the cutting saw 20 connection component 366. The second connection means 376, includes but is not limited to, a bolt, screw, rivet and/or other connection means. The second saw connection component connection means 376 is illustrated as a threaded screw a with a protruding head component to include additional binding force and prevent turning and/or slipping of the second saw connection component connection means 376, the protruding head including a hexagonal receptacle for engaging a hexagonal and/or ALLEN wrench. In another embodiment, the second saw connection component connection means 376 and the top threaded central receptacle 374 are partially threaded. However, the present invention is not limited to such embodiments and other connection means can be used to practice the invention.

Figure 19:
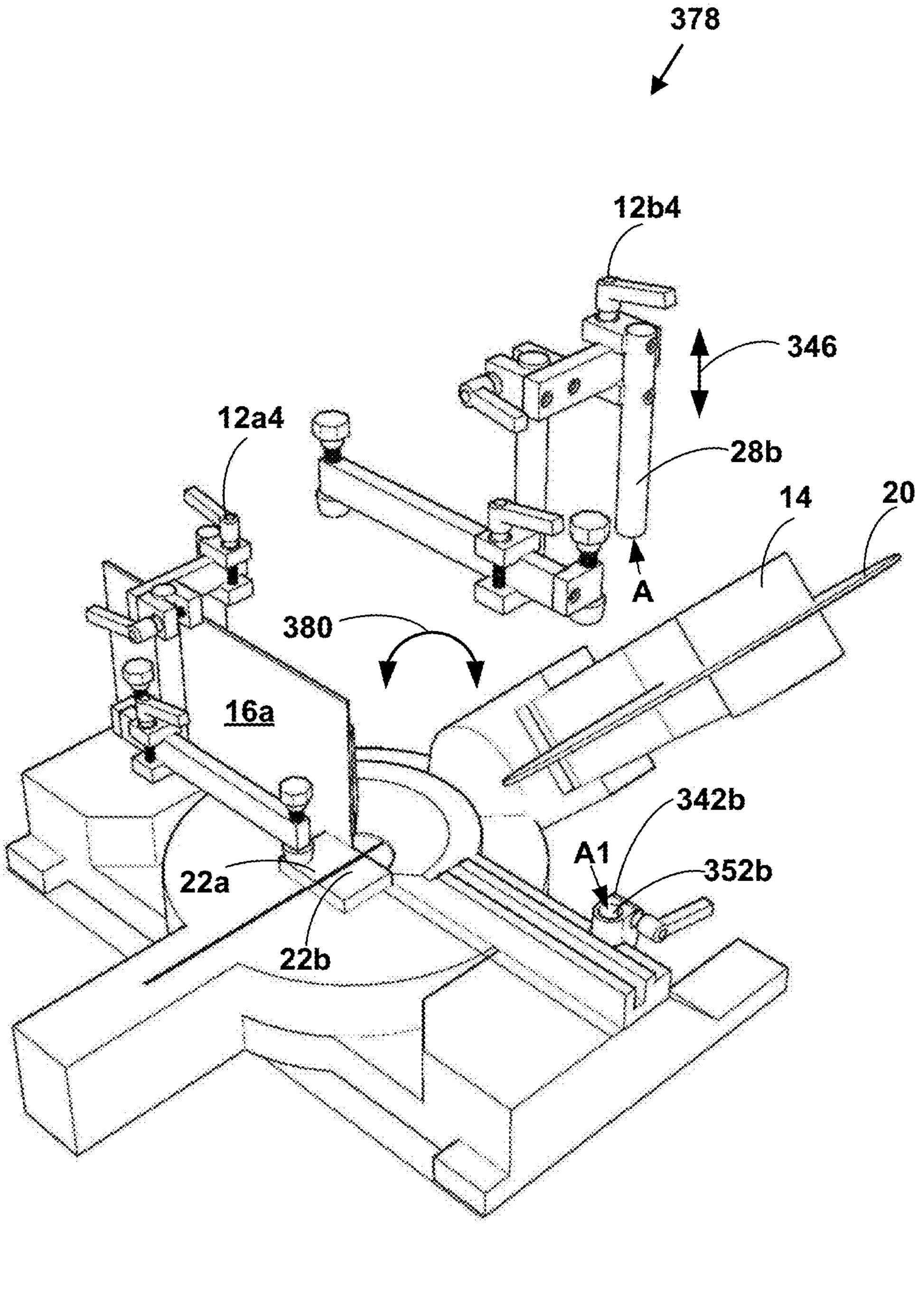
FIG. 19 is a block diagram illustrating a perspective view of clamping components of the cutting protection guide for cutting tools.

FIG. 19 is a block diagram 378 illustrating a perspective view of clamping components of the cutting protection guide for cutting tools.

FIG. 19 illustrates cutting saw 14 tipped an angle-X 380 to cut materials 22*aa*, 22*b* at the angle-X 380. The quick release mounting component 342*b* is temporarily and quickly disconnected at point A on saw mounting component 28*b* from the central receptacle 352*b* in the quick release mounting component 342*b* at point A1. The quick release mounting component 342*b* does not have to be removed by removing the sixth saw connection component connection means 370 that connects it to the mounting saw 14. Zero-clearance fence 16*b* has been removed and is not illustrated in FIG. 19 to allow cutting of the materials 22*aa*, 22*b* at the angle-X 380. Once the materials have been cut, quick release mounting component 342*b* is quickly put back in place on the cutting saw 14.

In one embodiment, the cutting protection guide 12*a*, 12*b*, as illustrated in FIGS. 1-16 includes but is not limited to: a vertical saw mounting component 28, 28*a*, 28*b* to connect the vertical saw mounting component 28, 28*a*, 28*b* to a cutting saw 14, the vertical saw mounting component 28, 28*a*, 28*b* absorbing and counteracting vibrational and torquing forces from a cutting blade 20 on the cutting saw 14; a first clamping adjustment component 50, 60, 62, 72, 74, 76 connected to the vertical saw mounting component 28, 28*a*, 28, the first clamping component 50, 60, 62, 72, 74, 76 applying adjustable downward clamping pressure 210 on a first horizontal clamping component 44 for clamping materials 22*a*, 22*b* to be cut on a top surface 14*t* of the cutting saw 14, the first adjustment component 50, 60, 62, 72, 74, 76 including a first handle 72 rotatable to apply pressure to and release pressure on the first horizontal clamping component 44, and the first clamping adjustment component 50, 60, 62, 72, 74, 76 allowing the first horizontal component 44 to move horizontally 212 back and forth to move a second horizontal component 116 with a clamping point 137 closer to and farther away from the cutting blade 20 on the cutting saw 14 to adjust the clamping point 137 for cutting the materials 22*a*, 22*b* to be cut of varying widths; a second clamping adjustment component 78, 90, 92, 94, 96 connected to the first horizontal component 44, the second clamping component 78, 90, 92, 94, 96 applying adjustable sideways clamping pressure 214 on a first vertical clamping component 82, the second clamping adjustment component including a second handle 92 rotatable to apply pressure and to release pressure on the first vertical clamping component 82, the second clamping adjustment component 78, 90, 92, 94, 96 allowing the second horizontal component 116 with the clamping point 137 to move vertically 216 up and down on the first vertical clamping component 82 to adjust the clamping point 137 for cutting the materials 22*a*, 22*b* to be cut of varying heights, and the second clamping adjustment component 78, 90, 92, 94, 96 also allowing the second horizontal component with the clamping point to move in a desired arc curve 218 horizontally along the top surface 14*t* of the cutting saw 14 to provide clamping pressure to allowing cutting of the materials 22*a*, 22*b* to be cut at a desired angle with the blade 20 of the cutting saw 14; a third clamping adjustment component 118, 128, 130, 134, 136 connected to the first vertical clamping component 116, the third clamping component 118, 128, 130, 134, 136 applying adjustable downward clamping pressure 222 on the second horizontal clamping component 116 and the clamping point 137, the third clamping adjustment component 118, 128, 130, 134, 136 including a third handle 130 rotatable to apply pressure and to release pressure on the second horizontal clamping component 116, and the third clamping adjustment component 118, 128, 130, 134, 136 allowing the second horizontal component 116 to move horizontally 222 back and forth to move the clamping point 137 horizontally closer to and farther away from the cutting blade 20 of the cutting saw 14 to adjust the clamping point 137 for cutting materials the materials to be cut 22*a*, 22*b* of very small lengths and widths; a horizontal movement 222 of the second horizontal clamping component 116 perpendicular to a horizontal movement 212 of the first horizontal clamping component 44; a fourth clamping adjustment component 150, 154, 158, 160, 162, 166 connected to the second horizontal clamping component on a first end at the clamping point 137, the fourth clamping adjustment component 150, 154, 158, 160, 162, 166 applying adjustable downward clamping pressure 224 on the second horizontal clamping component 116 at the clamping point 137 to securely hold the materials 22*a,* 22*b* to be cut on the top surface 14*t* of the cutting saw 14, the fourth clamping adjustment component 150, 154, 158, 160, 162, 166 including a fourth handle 154 rotatable to apply pressure and to release pressure on the second horizontal clamping component 116 at the clamping point 137; and a fifth clamping adjustment component 170, 172, 174, 180, 186, 190, 192, 198, 200 connected to the second horizontal clamping component 116 on a second end opposite at the clamping point 137, the fifth clamping adjustment component 170, 172, 174, 180, 186, 190, 192, 198, 200 applying adjustable downward clamping pressure 228 on the second horizontal clamping component 116 opposite clamping the point 137 to securely hold the second horizontal component 116 on the top surface 14*t* of the cutting saw 14 and from the cutting blade 20 on the cutting saw 20, the fifth clamping adjustment component including a fifth handle 86 rotatable to apply downward clamping pressure 228 and to release downward clamping pressure 228 on the second horizontal clamping component 116 at the second end opposite the clamping point 137 and the fifth clamping adjustment component 170, 172, 174, 180, 186, 190, 192, 198, 200 absorbing vibrational forces and torquing forces from the cutting blade 20 on the cutting saw 14. However, the present invention is not limited to such an embodiment and other embodiments can be used to practice the invention.

In one embodiment, as illustrated in FIGS. 17-20, a sixth clamping adjustment component 342 including a central receptacle 352 in a top portion to engage and securely hold a bottom portion of the vertical saw mounting component 28*b,* the sixth clamping adjustment component including a bottom portion 366 to securely mount the sixth clamping adjustment component 342 with a the sixth saw connection component connection means 370 to the cutting saw 14, the sixth clamping adjustment component 342 including a sixth handle rotatable 360 to apply pressure to and release pressure on the sixth clamping component 342 to tighten and release the vertical saw mounting component 28*b* in the central receptacle 352, the sixth clamping component 342 allowing the cutting protection guide 12*b*4 to be inserted onto and removed from the cutting saw 14 via the vertical mounting component 28*b,* and the sixth clamping adjustment component 342 allowing the clamping point 137 to be additionally adjusted up and down vertically 346 for cutting the materials 22*a,* 22*b* to be cut of larger heights and larger widths. However, the present invention is not limited to such an embodiment and other embodiments can be used to practice the invention.

Individual components of the cutting protection guide 12*a,* 12*b,* 12*a,* 12*b*2, 12*a*3, 12*b*3, 12*a*4, 12*b*4 for cutting tools comprise: metal components including iron, steel, stainless steel or aluminum metal components, rubber, wood, plastic or composite materials components or combinations thereof. However, the present invention is not limited to such embodiments and other embodiments with other materials can be used to practice the invention.

Various component of the cutting protection guide for cutting tools 12*a,* 12*b,* 12*a,* 12*b*2, 12*a*3, 12*b*3, 12*a*4, 12*b*4 are individually manufactured, machined, 3D printed by a 3D printer, extruded and/or pultruded including metal, rubber, wood, plastic and/or composite materials and/or combinations thereof.

However, the present invention is not limited to such embodiments and other embodiments with other ways to create cutting protection guide for cutting tools 12*a,* 12*b,* 12*a,* 12*b*2, 12*a*3, 12*b*3, 12*a*4, 12*b*4 can be used to practice the invention.

"Manufacturing" includes the process of making items from raw materials. "Machining" includes various processes in which a piece of raw material is cut into a desired final shape and size by a controlled material-removal process.

A "3D printer" includes 3D printing or "Additive manufacturing." 3D printing is a process of making a three-dimensional solid object of virtually any shape from a digital model. 3D printing is achieved using an "additive process," where successive layers of material (e.g., metal, plastic, etc.) are laid down in different shapes. 3D printing is also considered distinct from traditional manufacturing and/or machining techniques, which mostly rely on the removal of material by methods such as cutting or drilling and are "subtractive" processes.

"Extrusion" is a manufacturing process where a material such as aluminum, etc. is pushed and/or drawn through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material. "Pultruson" is a manufacturing process for producing continuous lengths of materials. Pultruson raw materials include metals such as aluminum, etc. or a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

There are also protruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultrusion process is normally continuous and highly automated. Reinforcement materials, such as roving, mat or fabrics, are positioned in a specific location using preforming shapers or guides to form a pultrusion. The reinforcements are drawn through a resin bath where the material is thoroughly coated or impregnated with a liquid thermosetting resin. The resin-saturated reinforcements enter a heated metal pultruson die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultruson die to the exact shape of the die cavity. The laminate solidifies when cooled and it is continuously pulled through the pultruson machine and cut to the desired length. The process is driven by a system of caterpillar or tandem pullers located between the die exit and the cut-off mechanism.

A "composite material" is a combination of two materials with different physical and chemical properties. The different physical or chemical properties of the two materials remain separate and distinct at the macroscopic or microscopic scale within the finished structure. Common polymer-based composite materials, include at least two parts, a substrate (e.g., fibers, etc.) and a resin.

When they are combined, they create a material which is specialized material to do a certain job, for instance to become stronger, lighter or resistant to electricity. Composite materials also improve strength and stiffness of the materials. One reason for their use over traditional materials is because they improve the properties of their base materials and are applicable in many situations.

The composite materials include, but are not limited to, "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

A cutting protection guide for cutting tools is presented herein. The Cutting protection guide includes different clamping components providing plural adjustable clamping pressures at plural different vertical and horizontal and arc curve position locations for a clamping point to clamp down and securely hold a piece of material being cut on a cutting saw. The cutting protection guide allows very small pieces (e.g., about 1 to 2 inches, etc.) of materials (e.g., wood, metal, plastic, etc.) to be safely cut without endangering a safety of a user using the cutting saw.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A cutting protection guide for cutting tools, comprising in combination:

a vertical saw mounting component connected to a cutting saw, the vertical saw mounting component absorbing vibrational and torquing forces from a cutting blade on the cutting saw;

a first clamping adjustment component connected to the vertical saw mounting component, the first clamping component applying adjustable downward clamping pressure on a first horizontal clamping component for clamping materials to be cut on a top surface of the cutting saw, the first clamping adjustment component including a first handle rotatable to apply pressure to and release pressure on the first horizontal clamping component, and the first clamping adjustment component allowing the first horizontal component to move horizontally back and forth to move a second horizontal component with a clamping point closer to and farther away from the cutting blade of the cutting saw to adjust the clamping point for cutting the materials to be cut of varying widths;

a second clamping adjustment component connected to the first horizontal component, the second clamping component applying adjustable sideways clamping pressure on a first vertical clamping component, the second clamping adjustment component including a second handle rotatable to apply pressure and to release pressure on the first vertical clamping component, the second clamping adjustment component allowing the second horizontal component with the clamping point to move vertically up and down on the first vertical clamping component to adjust the clamping point for cutting the materials to be cut of varying heights, and the second clamping adjustment component also allowing the second horizontal component with the clamping point to move in a desired arc curve horizontally along the top surface of the cutting saw to provide clamping pressure to allowing cutting of the materials to be cut at a desired angle with the blade of the cutting saw;

a third clamping adjustment component connected to the first vertical clamping component, the third clamping component applying adjustable downward clamping pressure on the second horizontal clamping component and the clamping point, the third clamping adjustment component including a third handle rotatable to apply pressure and to release pressure on the second horizontal clamping component, and the third clamping adjustment component allowing the second horizontal component to move horizontally back and forth to move the clamping point horizontally closer to and farther away from the cutting blade of the cutting saw to adjust the clamping point for cutting materials the materials to be cut of very small lengths and widths, a horizontal movement of the second horizontal clamping component perpendicular to a horizontal movement of the first horizontal clamping component;

a fourth clamping adjustment component connected to the second horizontal clamping component on a first end at the clamping point, the fourth clamping adjustment component applying adjustable downward clamping pressure on the second horizontal clamping component at the clamping point to securely hold the materials to be cut on the top surface of the cutting saw, the fourth clamping adjustment component including a fourth handle rotatable to apply pressure and to release pressure on the second horizontal clamping component at the clamping point; and a fifth clamping adjustment component connected to the second horizontal clamping component on a second end opposite at the clamping point, the fifth clamping adjustment component applying adjustable downward clamping pressure on the second horizontal clamping component opposite clamping the point to securely hold the second horizontal component on the top surface of the cutting saw and from a cutting blade on the cutting saw, the fifth clamping adjustment component including a fifth handle rotatable to apply downward clamping pressure and to release downward clamping pressure on the second horizontal clamping component at the second end opposite the clamping point, and the fifth clamping adjustment component also absorbing vibrational forces and torquing forces from the cutting blade on the cutting saw.

2. The cutting protection guide for cutting tools of claim 1, wherein the vertical saw mounting component includes a solid cylindrical component or a hollow cylindrical component.

3. The cutting protection guide for cutting tools of claim 2, wherein the hollow cylindrical component includes a spring, pneumatic cylinder or hydraulic cylinder to apply additional downward pressure on second horizontal clamping component at the clamping point and to absorb vibrational forces and torquing forces from the cutting blade of the cutting saw when materials are cut with the cutting saw.

4. The cutting protection guide for cutting tools of claim 1, wherein the vertical saw mounting component includes one or more different types of connection blocks each one or more receptacles on a bottom surface and one or more connection means to mount the vertical saw mounting component to the cutting saw.

5. The cutting protection guide for cutting tools of claim 1, wherein the first, second, third, fourth and fifth handles include adjustment handles that are rotated in one direction to increase pressure and rotated in another direction to release pressure.

6. The cutting protection guide for cutting tools of claim 1, wherein the first, second and third handles include gripping handles that are rotated in one direction to increase pressure and rotated in another direction to release pressure.

7. The cutting protection guide for cutting tools of claim 1, wherein the fourth and fifth handles include nob handles that are rotated in one direction to increase pressure and rotated in another direction to release pressure.

8. The cutting protection guide for cutting tools of claim 1, wherein the fourth clamping adjustment component includes a first grommet at the clamping point and the fifth clamping adjustment component includes a second grommet on second horizontal clamping component on the second end opposite at the clamping point.

9. The cutting protection guide for cutting tools of claim 8, wherein first grommet and the second includes a rubber, plastic or composite material.

10. The cutting protection guide for cutting tools of claim 1, wherein the first clamping adjustment component is connected to a first side block component for engaging and securely holding the first horizontal component on a first top side of the first horizontal clamping component and a second side block component for engaging and securely the first horizontal component on a second side of the first horizontal clamping component at a plurality of different horizontal position locations on first horizontal clamping component.

11. The cutting protection guide for cutting tools of claim 10, wherein the cutting saw includes one or more receptacles for engaging one or more connection means to connect the single block component to the cutting saw with the single block.

12. The cutting protection guide for cutting tools of claim 1, wherein the first clamping adjustment component is connected a single block component with a sixth clamping adjustment component with a central receptacle for engaging and securely holding the vertical saw mounting component at a plurality of different vertical position locations on the vertical saw mounting component providing additional vertical position locations for the clamping point for cutting materials of varying heights.

13. The cutting protection guide for cutting tools of claim 12, wherein the first clamping adjustment component connected to the single block component includes one or more mounting receptacles in a bottom surface of the single block to accept and engage one or more connection means to connect the single block component to the cutting saw.

14. The cutting protection guide for cutting tools of claim 1, wherein the first clamping adjustment component includes a clamping block with one or more extension components and with a seventh clamping adjustment component with a central receptacle for engaging and securely holding the vertical saw mounting component at a plurality of different vertical position locations on the vertical saw mounting component, the one or more extension components providing additional vertical position locations for the clamping point for cutting materials of varying heights.

15. The cutting protection guide for cutting tools of claim 1, wherein vertical saw mounting component includes one or more mounting receptacles in a bottom surface of the to accept and engage one or more connection means to connect the clamping block of the vertical saw mounting component to the cutting saw.

16. The cutting protection guide for cutting tools of claim 1, wherein the second clamping adjustment component is connected to a first side block component for engaging and securely holding the vertical clamping component on a first side of the first vertical clamping component and a second side block component for engaging and securely the vertical clamping component on a second side of the first vertical clamping component at a plurality of different vertical position locations on the vertical clamping component.

17. The cutting protection guide for cutting tools of claim 1, wherein the second clamping adjustment component is connected to a single block component with a central receptacle for engaging and securely holding the vertical clamping component at a plurality of different vertical position locations on the vertical clamping component.

18. The cutting protection guide for cutting tools of claim 1, further comprising:

a sixth clamping adjustment component including a central receptacle in a top portion to engage and securely hold a bottom portion of the vertical saw mounting component, the sixth clamping adjustment component including a bottom portion to securely mount the sixth clamping adjustment component with a sixth saw connection component connection means to the cutting saw, the sixth clamping adjustment component including a sixth handle rotatable to apply pressure to and release pressure on the sixth clamping component to tighten and release the vertical saw mounting component in the central receptacle, the sixth clamping component allowing the cutting protection guide to be temporarily inserted onto and removed from the cutting saw via the vertical mounting component without removing the sixth saw connection component connection means from the cutting saw, and the sixth clamping adjustment component allowing the clamping point to be additionally adjusted up and down vertically for cutting the materials to be cut of larger heights and larger widths.

19. The cutting protection guide for cutting tools of claim 1, wherein, individual components of the cutting protection guide for cutting tools comprise: metal components including iron, steel, stainless steel or aluminum metal components, rubber, wood, plastic or composite materials components or combinations thereof.

20. The cutting protection guide for cutting tools of claim 1, wherein, individual components are individually manufactured, machined, 3D printed by a 3D printer, extruded or pultruded including metal, rubber, wood, plastic or composite materials, or combinations thereof.

21. The cutting protection guide for cutting tools of claim 1, further including one or more safety fences mounted on the cutting saw to hold an edge of the materials being cut on the cutting saw.

22. The cutting protection guide for cutting tools of claim 21, wherein the one or more safety fences include one or more zero-clearance fences.

23. A safety system for a cutting saw, comprising in combination:

a first cutting protection guide mounted on a right side of a cutting blade on a cutting saw for holding materials to be cut;

a second cutting protection guide mounted on a left side of the cutting blade on the cutting saw for holding the materials to be cut;

the first cutting protection guide and the second cutting protection guide each comprising:

a vertical saw mounting component connected to a cutting saw, the vertical saw mounting component absorbing vibrational and torquing forces from the cutting blade on the cutting saw;

a first clamping adjustment component connected to the vertical saw mounting component, the first clamping component applying adjustable downward clamping pressure on a first horizontal clamping component for clamping materials to be cut on a top surface of the cutting saw, the first clamping adjustment component including a first handle rotatable to apply pressure to and release pressure on the first horizontal clamping component, and the first clamping adjustment component allowing the first horizontal component to move horizontally back and forth to move a second horizontal component with a clamping point closer to and farther away from the cutting blade of the cutting saw to adjust the clamping point for cutting the materials to be cut of varying widths;

a second clamping adjustment component connected to the first horizontal component, the second clamping component applying adjustable sideways clamping pressure on a first vertical clamping component, the second clamping adjustment component including a second handle rotatable to apply pressure and to release pressure on the first vertical clamping component, the second clamping adjustment component allowing the second horizontal component with the clamping point to move vertically up and down on the first vertical clamping component to adjust the clamping point for cutting the materials to be cut of varying heights, and the second clamping adjustment component also allowing the second horizontal component with the clamping point to move in a desired arc curve horizontally along the top surface of the cutting saw to provide clamping pressure to allowing cutting of the materials to be cut at a desired angle with the blade of the cutting saw;

a third clamping adjustment component connected to the first vertical clamping component, the third clamping component applying adjustable downward clamping pressure on the second horizontal clamping component and the clamping point, the third clamping adjustment component including a third handle rotatable to apply pressure and to release pressure on the second horizontal clamping component, and the third clamping adjustment component allowing the second horizontal component to move horizontally back and forth to move the clamping point horizontally closer to and farther away from the cutting blade of the cutting saw to adjust the clamping point for cutting materials the materials to be cut of very small lengths and widths, a horizontal movement of the second horizontal clamping component perpendicular to a horizontal movement of the first horizontal clamping component;

a fourth clamping adjustment component connected to the second horizontal clamping component on a first end at the clamping point, the fourth clamping adjustment component applying adjustable downward clamping pressure on the second horizontal clamping component at the clamping point to securely hold the materials to be cut on the top surface of the cutting saw, the fourth clamping adjustment component including a fourth handle rotatable to apply pressure and to release pressure on the second horizontal clamping component at the clamping point;

a fifth clamping adjustment component connected to the second horizontal clamping component on a second end opposite at the clamping point, the fifth clamping adjustment component applying adjustable downward clamping pressure on the second horizontal clamping component opposite clamping the point to securely hold the second horizontal component on the top surface of the cutting saw and from a cutting blade on the cutting saw, the fifth clamping adjustment component including a fifth handle rotatable to apply downward clamping pressure and to release downward clamping pressure on the second horizontal clamping component at the second end opposite the clamping point, and the fifth clamping adjustment component also absorbing vibrational forces and torquing forces from the cutting blade on the cutting saw;

a sixth clamping adjustment component including a central receptacle in a top portion to engage and securely hold a bottom portion of the vertical saw mounting component, the sixth clamping adjustment component including a sixth bottom portion to securely mount the sixth clamping adjustment component with a sixth saw connection component connection means to the cutting saw, the sixth clamping adjustment component including a sixth handle rotatable to apply pressure to and release pressure on the sixth clamping component to tighten and release the vertical saw mounting component in the central receptacle, the sixth clamping component allowing the cutting protection guide to be temporarily inserted onto and removed from the cutting saw via the vertical mounting component without removing the sixth saw connection component connection means from the cutting saw, and the sixth clamping adjustment component allowing the clamping point to be additionally adjusted up and down vertically for cutting the materials to be cut of larger heights and larger widths;

a first safety fence mounted on a right side of the cutting saw to hold a first edge of the materials to be cut on the cutting saw; and a second safety fence mounted on a left side of the cutting saw to hold a second edge of the materials to be cut on the cutting saw.

24. The safety system for a cutting saw of claim 23, wherein the first safety fence and the second safety fence include zero-clearance safety fences.

* * * * *